United States Patent
Botha et al.

(10) Patent No.: US 10,569,255 B2
(45) Date of Patent: Feb. 25, 2020

(54) HYDROCARBON SYNTHESIS CATALYST, ITS PREPARATION PROCESS AND ITS USE

(71) Applicant: Sasol Technology (Pty) Limited, Sandton, Johannesburg (ZA)

(72) Inventors: Jan Mattheus Botha, Sasolburg (ZA); Jacobus Lucas Visagie, Sasolburg (ZA); Adam Cullen, Cleveland (GB); Jana Heloise Taljaard, Sasolburg (ZA); Rita Meyer, Vereeniging (ZA)

(73) Assignee: Sasol Technology (Pty) Limited, Johannesburg (ZA)

( * ) Notice: Subject to any disclaimer, the term of this patent is extended or adjusted under 35 U.S.C. 154(b) by 0 days.

(21) Appl. No.: 15/546,864

(22) PCT Filed: Feb. 12, 2016

(86) PCT No.: PCT/IB2016/050745
§ 371 (c)(1),
(2) Date: Jul. 27, 2017

(87) PCT Pub. No.: WO2016/135577
PCT Pub. Date: Sep. 1, 2016

(65) Prior Publication Data
US 2018/0008961 A1 Jan. 11, 2018

(30) Foreign Application Priority Data
Feb. 25, 2015 (ZA) .................. 2015/1288

(51) Int. Cl.
*B01J 21/06* (2006.01)
*B01J 23/34* (2006.01)
(Continued)

(52) U.S. Cl.
CPC ............. *B01J 21/063* (2013.01); *B01J 23/34* (2013.01); *B01J 23/8892* (2013.01);
(Continued)

(58) Field of Classification Search
None
See application file for complete search history.

(56) References Cited

U.S. PATENT DOCUMENTS 6,333,294 B1 12/2001 Chao
2002/0010221 A1 1/2002 Ionkina
(Continued)

FOREIGN PATENT DOCUMENTS

AU 2013203123 8/2013
EP 0 966 415 12/1999
(Continued)

OTHER PUBLICATIONS

International Search Report dated Jul. 7, 2016 (five pages) out of PCT priority Application PCT/IB2016/050745 filed Feb. 12, 2016.
(Continued)

*Primary Examiner* — Colin W. Slifka
(74) *Attorney, Agent, or Firm* — Brinks Gilson & Lione

(57) ABSTRACT

The present invention relates to catalysts, more particularly to a cobalt-containing catalyst composition. The present invention further relates to a process for preparing a cobalt-containing catalyst precursor, a process for preparing a cobalt-containing catalyst, and a hydrocarbon synthesis process wherein such a catalyst is used. According to a first aspect of the invention, there is provided a cobalt-containing catalyst composition comprising cobalt and/or a cobalt compound supported on and/or in a catalyst support; the catalyst composition also including a titanium compound on and/or in the catalyst support, and a manganese compound on and/or in the catalyst support.

13 Claims, 3 Drawing Sheets

(51) Int. Cl.
  *B01J 23/889* (2006.01)
  *B01J 23/89* (2006.01)
  *B01J 37/02* (2006.01)
  *B01J 37/04* (2006.01)
  *B01J 37/08* (2006.01)
  *C10G 2/00* (2006.01)

(52) U.S. Cl.
  CPC ....... *B01J 23/8913* (2013.01); *B01J 37/0201* (2013.01); *B01J 37/0236* (2013.01); *B01J 37/04* (2013.01); *B01J 37/08* (2013.01); *C10G 2/332* (2013.01); *C10G 2/333* (2013.01)

(56) References Cited

U.S. PATENT DOCUMENTS

| | | |
|---|---|---|
| 2004/0127352 A1 | 7/2004 | Jin |
| 2007/0123594 A1 | 5/2007 | Dogterom |
| 2008/0064769 A1 | 3/2008 | Sato |
| 2008/0132589 A1 | 6/2008 | Reynhout |
| 2008/0255256 A1 | 10/2008 | Rytter |
| 2010/0099780 A1 | 4/2010 | Rytter |
| 2012/0252665 A1 | 10/2012 | Hughes |
| 2014/0045953 A1 | 2/2014 | Daly |
| 2014/0080929 A1 | 3/2014 | Eloff |
| 2014/0088206 A1 | 3/2014 | Daly |

FOREIGN PATENT DOCUMENTS

| | | |
|---|---|---|
| WO | WO 99/61550 | 12/1999 |
| WO | WO 00/20116 | 4/2000 |
| WO | WO 2008/104793 | 9/2008 |
| WO | WO 2012/107718 | 8/2012 |
| WO | WO 2014/020507 | 2/2014 |

OTHER PUBLICATIONS

Written Opinion of the International Searching Authority (PCT Rule 43bisI) dated Jul. 7, 2016 (seven pages) out of PCT priority Application PCT/IB2016/050745 filed Feb. 12, 2016.

International Preliminary Report on Patentability dated Jun. 20, 2017 (29 pages) out of PCT priority Application PCT/IB2016/050745 filed Feb. 12, 2016.

Feltes et al., "Selective adsorption of manganese onto cobalt for optimized Mn/Co/TiO$_2$ FischerTropsch catalysts", Journal of Catalysis, vol. 270, Issue I, Mar. 22, 2010, pp. 95-102, NPL Reference No. XP026916185.

ly to a cobalt-containing catalyst composition. The present invention further relates to a process for preparing a cobalt-containing catalyst precursor, a process for preparing a cobalt-containing catalyst, and a hydrocarbon synthesis process wherein such a catalyst is used.

HYDROCARBON SYNTHESIS CATALYST, ITS PREPARATION PROCESS AND ITS USE

This application claims priority to International Application No. PCT/IB2016/050745 filed Feb. 12, 2016; and to South African Application No. 2015/01288 filed Feb. 25, 2015; the entire contents of each are incorporated herein by reference.

TECHNICAL FIELD

The present invention relates to catalysts, more particularly to a cobalt-containing catalyst composition. The present invention further relates to a process for preparing a cobalt-containing catalyst precursor, a process for preparing a cobalt-containing catalyst, and a hydrocarbon synthesis process wherein such a catalyst is used.

BACKGROUND ART

Hydrocarbon synthesis from synthesis gas (syngas) containing hydrogen and carbon monoxide in the presence of a Fischer-Tropsch (FT) synthesis catalyst is commonly known as FT synthesis. During the FT synthesis, the syngas is contacted with the FT synthesis catalyst under FT synthesis conditions to produce the hydrocarbons. One type of catalyst which is often used in low temperature FT (LTFT) synthesis comprises an active catalyst component such as Co supported on and/or in a catalyst support such as alumina, silica, titania, magnesia or the like, and the hydrocarbons produced are usually in the form of a waxy hydrocarbon product.

It is known that during FT synthesis the activity of catalysts, such as Co supported on a support usually decreases over time (that is, the catalyst deactivates), with the result that less syngas is converted into hydrocarbons. This characteristic of a catalyst that its activity may decrease over time during hydrocarbon synthesis is referred to as the activity stability of the catalyst.

As stated above, a lack of activity stability of a catalyst has the effect that the catalyst deactivates over time and less hydrocarbons are then produced. To counter this effect, the temperature of the FT synthesis process may be increased to make up for the loss of activity of the catalyst. However, an increased reaction temperature has the disadvantage that more unwanted methane is formed during the FT synthesis. Other costly measurements such as increased catalyst loading, catalyst rejuvenation or catalyst reactivation may also be taken to recover the hydrocarbon production.

It is known in the art that many different components such as modifiers, dopants and promoters may be introduced into catalysts in order to improve certain aspects of the catalyst, such as improved hydrothermal stability, improved reducibility of the active component, improved activity of the catalyst, improved product selectivity of the catalyst and improved activity stability of the catalyst during FT synthesis. A long list of such components is known to be suitable for the purposes set out above, for example Si, Ti, Zr, Cu, Zn, Ba, Co, Ni, La, W, Na, K, Ca, Sn, Cr, Fe, Li, Tl, Mg, Sr, Ga, Sb, V, Hf, Th, Ce, Ge, U, Nb, Ta, Mn, Pt, Pd, Re and Ru. It has now been found that if Ti and Mn in combination are included in a cobalt-containing catalyst, unexpected advantages are obtained.

WO 2014020507; WO 9961550; Applied Catalysis A: General, 419-420 (2012) 148-155; WO 2008104793; WO 2012107718; AU2013203123; US 20120252665 A1; Fuel Processing Technology, 89 (2008) 455-459 and Catalysis Today, 197 (2012) 18-23 disclose the inclusion of Ti in catalysts.

The inclusion of Mn in catalysts is disclosed in Journal of Catalysis, 246 (2007) 91-99; Journal of Physical Chemistry B, 110 (2006), 8626-8639; EP 0966415 A1; U.S. Pat. No. 6,333,294 B1; US 20020010221 A1; Fuel Processing Technology, 90 (2009) 901-908; Journal of Catalysis, 288 (2012) 104-114; Journal of Catalysis, 237 (2006) 152-161; US 20080132589; US 20080064769 A1; US 20100099780 A1 and US 20040127352 A1.

Most surprisingly, it has now been found that when a supported cobalt catalyst includes both titanium and manganese, the activity and/or activity stability of the catalyst and/or the lower methane selectivity of the catalyst and/or the lower support dissolution of the support is improved during hydrocarbon synthesis wherein syngas is contacted with the catalyst. This is shown by the Inventive Examples, for instance in FIGS. 1, 2 and 3 and Table 5, 7, 10 and 12 herein below.

DISCLOSURE OF THE INVENTION

Cobalt-Containing Catalyst Composition

According to a first aspect of the invention, there is provided a cobalt-containing catalyst composition comprising cobalt and/or a cobalt compound supported on and/or in a catalyst support; the catalyst composition also including a titanium compound on and/or in the catalyst support, and a manganese compound on and/or in the catalyst support.

The catalyst composition may be a hydrocarbon synthesis catalyst composition for synthesising hydrocarbons and/or oxygenates of hydrocarbons from at least hydrogen and carbon monoxide. Preferably, the catalyst composition is a Fischer-Tropsch (FT) synthesis catalyst composition for performing Fischer-Tropsch synthesis. The FT synthesis may be performed in a fixed bed reactor, a slurry bed reactor or a fixed fluidized bed reactor. Preferably, the FT synthesis is a three phase slurry bed FT synthesis process.

In one embodiment of the invention, the catalyst composition may include a cobalt compound in which case the catalyst composition may be a catalyst precursor. The cobalt compound may be a cobalt salt, alternatively it is a cobalt oxide. The cobalt salt may comprise any suitable cobalt salt such as cobalt hydroxide or cobalt nitrate. The cobalt oxide may be selected from the group consisting of CoO, CoO(OH), $Co_3O_4$, $Co_2O_3$ and a mixture of two or more thereof. Preferably, the cobalt oxide is $Co_3O_4$.

In another embodiment of the invention, the catalyst composition may include cobalt with a zero valency in which case the catalyst composition may be an active catalyst. The cobalt may be in the form of particles or preferably crystallites distributed over the support surface.

The catalyst precursor or the catalyst may contain cobalt (Co) at a loading of from 5 to 70 g Co/100 g catalyst support, preferably from 20 to 40 g Co/100 g catalyst support, and more preferably from 25 to 35 g Co/100 g catalyst support.

The catalyst composition may also include a dopant, preferably a dopant capable of enhancing the reducibility of a cobalt compound. The dopant may be in the form of a dopant compound which is a compound of a metal selected from the group including palladium (Pd), platinum (Pt), ruthenium (Ru), rhenium (Re) and a mixture of two or more thereof. The mass proportion of the metal of the dopant (especially palladium metal or platinum metal) to the cobalt metal may be from 1:300 to 1:3000.

The catalyst support may be selected from the group consisting of alumina in the form of one or more aluminium oxides; silica ($SiO_2$); titania ($TiO_2$); magnesia (MgO); zinc oxide (ZnO); silicon carbide; and mixtures thereof. Preferably, the support is selected from the group consisting of alumina in the form of one or more aluminium oxides; titania ($TiO_2$) and silica ($SiO_2$). Preferably, the support is an alumina catalyst support or a silica ($SiO_2$) catalyst support.

The alumina catalyst support may comprise one or more aluminium oxides which may be selected from the group including (preferably consisting of) gamma alumina, delta alumina, theta alumina and a mixture of two or more thereof.

Preferably the group includes, or, preferably, consists of gamma alumina, delta alumina and a mixture of gamma alumina and delta alumina.

The aluminium oxide catalyst support may be that obtainable under the trademark Puralox, preferably Puralox SCCa 2/150 from SASOL Germany GmbH. Puralox SCCa 2/150 (trademark) is a spray-dried aluminium oxide support consisting of a mixture of gamma and delta aluminium oxide. The aluminium oxide may also be the product supplied by SASOL Germany GmbH known as calcined PURAL 200™.

The aluminium oxide is preferably a crystalline compound which can be described by the formula $Al_2O_3.xH_2O$ where $0<x<1$. The term "aluminium oxide" thus excludes $Al(OH)_3$, and AlO(OH), but includes compounds such as gamma, delta and theta alumina.

Preferably, the alumina catalyst support includes more than 50 wt % $Al_2O_3$, preferably more than 80 wt % $Al_2O_3$, and most preferably more than 90 wt % $Al_2O_3$.

The silica ($SiO_2$) catalyst support may be a precipitated silica support. Preferably it is a fumed (it may also be referred to as a pyrogenic) silica support or a silica gel support. Preferably it is an amorphous silica support especially an amorphous fumed silica support or an amorphous silica gel support.

The alumina catalyst support is a porous support and preferably it is also pre-shaped. The alumina support preferably has an average pore diameter between 8 and 50 nanometres, more preferably between 10 and 15 nanometres.

The silica catalyst support is a porous support and preferably it is also pre-shaped. The silica support may have an average pore diameter from 10 to 20 nanometres.

The support pore volume may be between 0.1 and 1 ml/g catalyst support, preferably between 0.3 and 0.9 ml/g catalyst support.

The pre-shaped support may be a particulate support, preferably with an average particle size of between 1 and 500 micrometers, preferably between 10 and 250 micrometers, still more particularly between 45 and 200 micrometers.

Preferably, the catalyst composition includes more than 1 wt % and not more than 10 wt % Ti, based on the weight of the alumina catalyst support or other catalyst support, including a silica ($SiO_2$) catalyst support (excluding the weight of the Ti), the Ti being present in the form of one or more titanium compounds.

Preferably, the catalyst composition does not include more than 5 wt % Ti, preferably not more than 3.5 wt % Ti. Preferably, titanium, in the form of the one or more titanium compounds, may be present in and/or on the catalyst support in an amount of more than 1.5 wt %, preferably at least 2.0 wt %, more preferably at least 2.4 wt % Ti.

Preferably, titanium, in the form of the one or more titanium compounds, may be present in and/or on the catalyst support in an amount of less than 3.5 wt %, preferably not more than 3 wt %, but preferably more than 2 wt % Ti.

The preferred amount of titanium, in the form of the one or more titanium compounds, present in and/or on the catalyst support is about 2.6 wt % Ti. The Ti is preferably present as titanium oxide.

Preferably, the Ti is included as a support modifier, that is as Ti which has been introduced onto and/or into the catalyst support (and preferably also calcined) prior to a cobalt compound having been introduced onto and/or into the catalyst support.

Alternatively, the Ti may be included as a promoter, that is as Ti which has been introduced onto and/or into the catalyst support during and/or subsequent to a cobalt compound having been introduced onto and/or into the catalyst support.

Preferably, the catalyst composition includes more than 0.5 wt % and less than 10 wt % Mn, based on the weight of the alumina catalyst support or other catalyst support, including a silica ($SiO_2$) catalyst support (excluding the weight of the Mn), the Mn being present in the form of one or more manganese compounds.

Preferably, the catalyst composition does not include more than 7.5 wt % Mn, preferably not more than 5 wt % Mn. Preferably, manganese, in the form of the one or more manganese compounds, may be present in and/or on the catalyst support in an amount of more than 1 wt %, preferably at least 1.5 wt %, more preferably at least 1.8 wt % Mn.

Preferably, manganese, in the form of the one or more manganese compounds, may be present in and on the catalyst support in an amount of less than 5 wt %, preferably not more than 3.5 wt %, but preferably more than 1.8 wt % Mn.

The preferred amount of manganese, in the form of the one or more manganese compounds, present in and on the catalyst support is about 3.1 wt % Mn. The manganese is preferably present as manganese oxide.

The Mn may be included as a promoter, that is as Mn which has been introduced onto and/or into the catalyst support during and/or subsequent to a cobalt compound having been introduced onto and/or into the catalyst support.

Alternatively and preferably, the Mn may be included as a support modifier, that is as Mn which has been introduced onto and/or into the catalyst support (and preferably also calcined) prior to a cobalt compound having been introduced onto and/or into the catalyst support.

In one embodiment of the invention, the catalyst composition includes no or substantially no Re. Preferably, if any Re is present in the catalyst composition, the Re to Co weight ratio is below 0.001:1.

Process for Preparing a Cobalt-Containing Catalyst Precursor

According to a second aspect of the present invention, there is provided a process for preparing a cobalt-containing catalyst precursor, the process comprising introducing a cobalt compound onto and/or into a catalyst support; prior to and/or during and/or subsequent to introducing the cobalt compound onto and/or into the catalyst support, introducing a titanium compound onto and/or into the catalyst support; and prior to, and/or during, and/or subsequent to introducing the cobalt compound onto and/or into the catalyst support, introducing a manganese compound onto and/or into the catalyst support, thereby providing a cobalt-containing catalyst precursor.

It will be appreciated that by introducing a compound onto and/or into a catalyst support the compound may be contacted with a precursor compound of the support or it may be contacted with the support itself.

The catalyst precursor is preferably a catalyst precursor as described above.

The process preferably includes one or more calcination steps wherein at least the titanium and manganese compounds introduced into and/or onto the catalyst support are converted to titanium oxide and manganese oxide respectively.

The catalyst support is preferably a catalyst support as described above and preferably it is an alumina or a silica ($SiO_2$) catalyst support.

Preparing a Titanium-Containing Catalyst Support

The titanium compound may be introduced onto and/or into the catalyst support (the catalyst support may comprise a catalyst support other than an alumina catalyst support, preferably it comprises an alumina catalyst support or a silica ($SiO_2$) catalyst support) by preparing a titanium-containing catalyst support material by (i) contacting a catalyst support material (the catalyst support material may comprise a catalyst support material other than an aluminium-based catalyst support material, preferably it comprises an aluminium-based catalyst support material or a silicon-based catalyst support material) with a titanium compound, or (ii) co-hydrolysing a hydrolysable titanium compound and $Al(OR")_3$, wherein all R" are the same or different and are each an organic group; and calcining the titanium-containing catalyst support material at a temperature above 200° C. to obtain a catalyst support (the catalyst support may comprise a catalyst support other than an alumina catalyst support, but preferably it comprises an alumina catalyst support or a silica ($SiO_2$) catalyst support) which includes Ti in the form of one or more titanium compounds.

When used in the specification hereafter "catalyst support" and "catalyst support material" should be understood to also refer to the specific catalyst supports and catalyst support materials respectively in the manner as set out in the above paragraph, unless the context wherein said wording is used clearly dictates otherwise. For example, in the context of "alumina catalyst support" it only refers to an alumina catalyst support and not to the other mentioned catalyst supports.

Contacting the Catalyst Support Material with the Titanium Compound

The catalyst support material may be selected from the group consisting of a catalyst support precursor which is convertible to a catalyst support upon calcination thereof; and a catalyst support. The catalyst support precursor may comprise a catalyst support precursor other than an aluminium-based catalyst support precursor. Preferably the catalyst support precursor comprises an aluminium-based catalyst support precursor or a silicon-based catalyst support precursor.

The term "catalyst support precursor" should be understood to also refer to the specific catalyst support precursors, as set out in the above paragraph, unless the context wherein said wording is used clearly dictates otherwise.

When the catalyst support material is a catalyst support precursor, the titanium compound is preferably introduced onto and/or into the catalyst support (and preferably also calcined) prior to introducing the cobalt compound onto and/or into the catalyst support. In this embodiment, the titanium may serve as a support modifier.

The aluminium-based catalyst support precursor may be $Al(OH)_3$ (such as, for example, gibbsite and/or bayerite) and/or AlO(OH), and more preferably it is boehmite.

The catalyst support precursor may be shaped into particulate form after the introduction of the titanium compound onto and/or into the catalyst support precursor and preferably before calcination thereof. The shaping may, for example, be carried out by means of spray drying.

Prior to shaping the catalyst support precursor, it may be partially dried. The resulting shaped product may then be subjected to the calcination above 200° C. in order to convert the catalyst support precursor to a catalyst support. The calcination may take place prior to introducing the cobalt compound onto and/or into the shaped product. In order to achieve a desired particle size distribution, classification may be performed on the shaped particulate product, using, for example, cyclones or sieves.

However, the catalyst support material is preferably a catalyst support. The catalyst support is preferably suitable for use as a support in a catalyst for synthesising hydrocarbons and/or oxygenates of hydrocarbons from at least hydrogen and carbon monoxide, particularly a Fischer-Tropsch (FT) synthesis catalyst.

The FT synthesis catalyst may be for use in a process to be performed in a fixed bed reactor, slurry bed reactor or even a fixed fluidized bed reactor. Preferably, the process is to be performed in a three phase slurry bed FT synthesis reactor.

In a preferred embodiment of the invention, the catalyst support or catalyst support precursor may be contacted with the titanium compound (and preferably also calcined) prior to introducing the cobalt compound onto and/or into the catalyst support. In this embodiment, the titanium may serve as support modifier. Preferably, the calcination of the titanium containing catalyst support material also takes place prior to introducing the cobalt compound onto and/or into the alumina catalyst support.

In an alternative embodiment of the invention, the catalyst support or catalyst support precursor may be contacted with the titanium compound during and/or subsequent to introducing the cobalt compound onto and/or into the catalyst support. In this embodiment, the titanium may serve as a promoter. The calcination of the titanium containing catalyst support material then takes place subsequent to introducing the cobalt compound onto and/or into the catalyst support.

The catalyst support may be as described herein above.

As set out above, the catalyst support material is contacted with a titanium compound. The titanium compound may be an inorganic titanium compound, but preferably it is an organic titanium compound.

When referred to in this specification, an organic titanium compound should be understood to be a titanium compound wherein titanium is associated with at least one organic group by means of a bond, for instance by means of a covalent bond, a metal-to-ligand coordination or an ionic interaction.

Preferably, in the organic titanium compound, titanium is associated with at least one non-carbon atom of the at least one organic group, in particular with an oxygen atom of the organic group.

In one embodiment of the invention, at least one organic group of the organic titanium compound may be a chelating compound, preferably a chelating compound which binds to titanium by means of at least one non-carbon atom, preferably an oxygen atom (preferably by means of two oxygen atoms). Preferably, all the groups associated with the titanium are organic groups, and preferably all the said organic groups are associated with the titanium via an oxygen atom.

In one embodiment of the invention some, but preferably all, of the organic groups are of the formula —(O)—R where R is an organic group. R in different —(O)—R groups may be the same or different. R of an —(O)—R group may be bound, or may not be bound, to R of another —(O)—R group.

R may be an acyl or hydrocarbyl group or it may be a heterohydrocarbyl group (that is, an organic group consisting of carbon, hydrogen and at least one atom which is not carbon or hydrogen), preferably a hydrocarbyl group, preferably an alkyl group, and preferably an alkyl group with not more than eight carbon atoms.

Alternatively, R may be of the formula —$OR^1$ where $R^1$ may be a hydrocarbyl group or it may be a heterohydrocarbyl group (that is, an organic group consisting of carbon, hydrogen and at least one atom which is not carbon or hydrogen), preferably an alkyl group, preferably an alkyl group and preferably an alkyl group with not more than eight carbon atoms.

In one embodiment of the invention, the organic titanium compound may be selected from the group consisting of titanium (IV) methoxide; titanium (IV) ethoxide; titanium (IV) propoxide; titanium (IV) isopropoxide; titanium (IV) diisopropoxide bis(acetylacetonate); titanium (IV) 2-ethylhexoxide; titanium (IV) hexoxide; titanium(IV) butoxide and titanium (IV) bis(ammonium lactato) dihydroxide.

The contacting of the catalyst support material with the titanium compound may be by any suitable method including, for example, impregnation, precipitation, adsorption or chemical vapour phase deposition.

Preferably, the contacting of the titanium compound with the catalyst support material is by means of impregnation. A suitable impregnating liquid medium may be used to effect the contact between the titanium compound and the catalyst support material. The impregnation may be incipient wetness impregnation, but preferably it is slurry phase impregnation. Preferably, the liquid medium is a non-aqueous medium, such as an organic liquid medium, and preferably it is an alcohol such as ethanol. Alternatively, the liquid medium is an inorganic liquid medium, such as water. Preferably, the liquid medium is a solvent for the titanium compound.

The impregnation is preferably carried out at a temperature above 25° C. The temperature may be 50-60° C. The impregnation may be carried out for a period of from 1 minute to 20 hours, preferably from 1 minute to 5 hours. The impregnation may be effected at atmospheric pressure.

After impregnation, the excess impregnating liquid medium may be removed, preferably by means of drying. The drying is preferably carried out at sub-atmospheric conditions, preferably from 0.01 to 0.9 bar(a). The drying is preferably carried out at temperature above 25° C., more preferably at a temperature of not more than 125° C.

Co-Hydrolysing the Hydrolysable Titanium Compound and Al(OR")$_3$

It will be appreciated that in the co-hydrolysing embodiment of the invention the catalyst support material that is formed will be an aluminium-based catalyst support material.

In the embodiment of co-hydrolysis, the titanium compound is preferably introduced onto and/or into the catalyst support (and preferably also calcined) prior to introducing the cobalt compound onto and/or into the catalyst support. In this embodiment the titanium may serve as a support modifier.

Co-hydrolysis of the hydrolysable titanium compound and Al(OR")$_3$ may be carried out by mixing the hydrolysable titanium compound and Al(OR")$_3$ and hydrolysing the mixture. Hydrolysis of the mixture may be carried out by adding water to the mixture.

Preferably, the titanium-containing catalyst support material, which is formed by the co-hydrolysis, is titanium-containing boehmite. The titanium-containing boehmite may be dried, and preferably it is shaped into particulate form before calcination thereof. The shaping may be carried out by means of spray drying. The resulting shaped product may then be subjected to the calcination above 200° C. The calcination may take place prior to introducing the cobalt compound onto and/or into the shaped product. In order to achieve a desired particle size distribution, classification may be performed on the shaped particulate product, using, for example, cyclones or sieves.

The hydrolysable titanium compound may be a hydrolysable organic titanium compound. In this specification, a hydrolysable organic titanium compound is a titanium compound wherein titanium is associated with at least one oxygen atom of at least one organic group by means of a bond, for instance by means of a covalent bond, a metal to ligand coordination or an ionic interaction.

In one embodiment of the invention, at least one organic group of the hydrolysable organic titanium compound may be a chelating compound, preferably a chelating compound which binds to titanium by means of at least one oxygen atom; preferably by means of two oxygen atoms. Preferably, all the groups associated with the titanium are organic groups, and preferably all the said organic groups are associated with the titanium via an oxygen atom.

In one embodiment of the invention, the hydrolysable organic titanium compound may be Ti(OR')$_4$ wherein all R' are the same or different and each is an organic group. R' of an —(OR') group may be bound, or may not be bound, to R' of another —(OR') group. R' may be an acyl or hydrocarbyl group or it may be a heterohydrocarbyl group (that is, an organic group consisting of carbon, hydrogen and at least one atom which is not carbon or hydrogen), preferably a hydrocarbyl group, preferably an alkyl group, and preferably an alkyl group with not more than twelve carbon atoms, preferably an alkyl group with not more than eight carbon atoms. Preferably, R' is an alkyl with more than two carbon atoms. In one preferred embodiment of the invention, R' is hexyl. Preferably, all the R' groups are the same.

In one embodiment of the invention, the hydrolysable organic titanium compound may be selected from the group consisting of titanium (IV) methoxide; titanium (IV) ethoxide; titanium (IV) propoxide; titanium (IV) isopropoxide; titanium (IV) diisopropoxide bis(acetylacetonate); titanium (IV) 2-ethylhexoxide; titanium (IV) hexoxide; titanium(IV) butoxide and titanium (IV) bis(ammonium lactato) dihydroxide.

The R" of an (OR") group in Al(OR")$_3$ may be bound, or may not be bound, to the R" of another (OR") group. R" may be an acyl or hydrocarbyl group or it may be a heterohydrocarbyl group (that is, an organic group consisting of carbon, hydrogen and at least one atom which is not carbon or hydrogen), preferably a hydrocarbyl group, preferably an alkyl group, and preferably an alkyl group with not more than twelve carbon atoms. Preferably, R" is an alkyl with more than two carbon atoms. In one preferred embodiment of the invention, R" is hexyl. Preferably, all the R" groups are the same.

Calcination of the Titanium-Containing Support Material

The calcination of the titanium-containing catalyst support material may take place in a non-reducing environment, preferably in an oxidizing environment, such as in air. The calcination may be carried out either in a stationary or in a fluidized bed calciner. The calcination may instead take place in a rotary kiln. Most preferred, however, is a rotary kiln. The calcination may typically take place for a period of 10 minutes to 10 hours.

During the calcination of the titanium-containing catalyst support material prepared by contacting the catalyst support material with the titanium compound, the titanium compound in and/or on the catalyst support material may react and/or it may decompose and/or it may bond chemically to the catalyst support material; however, preferably, the calcination transforms the titanium compound to a titanium oxide, preferably by decomposition and/or reaction. During calcination of the titanium-containing catalyst support material prepared by co-hydrolysis, conversion to aluminium-titanium oxide may take place.

The calcination of the titanium-containing support material is preferably carried out at or above 350° C., preferably at at least 400° C., more preferably at above 500° C., still more preferably at least 525° C. Preferably, the calcination is carried out below 1200° C., preferably below 950° C.

Ti level after calcination may be as described herein above.

In one preferred embodiment of the invention, the titanium compound may be introduced onto and/or into the catalyst support (and preferably also calcined) prior to introducing the cobalt compound onto and/or into the catalyst support. In this embodiment, the titanium may serve as support modifier. Alternatively the titanium compound may be introduced onto and/or into the catalyst support during and/or subsequent to introducing the cobalt compound onto and/or into the catalyst support. In this embodiment, the titanium may serve as a promoter.

Preparing the Manganese-Containing Catalyst Support

The manganese compound may be introduced onto and/or into the catalyst support by preparing a manganese-containing catalyst support material by (i) contacting a catalyst support material with a manganese compound, or (ii) co-hydrolysing a hydrolysable manganese compound and Al(OR")$_3$, wherein all R" are the same or different and are each an organic group; and calcining the manganese-containing catalyst support material at a temperature above 180° C. to obtain a catalyst support which includes Mn in the form of one or more manganese compounds.

Contacting the Catalyst Support Material with the Manganese Compound

The catalyst support material may be selected from the group consisting of a catalyst support precursor which is convertible to a catalyst support upon calcination thereof; and a catalyst support.

When the catalyst support material is a catalyst support precursor, the manganese compound is preferably introduced onto and/or into the catalyst support (and preferably also calcined) prior to introducing the cobalt compound onto and/or into the catalyst support. In this embodiment, the manganese may serve as a support modifier.

The aluminium-based catalyst support precursor may be Al(OH)$_3$ (such as, for example, gibbsite and/or bayerite) and/or AlO(OH), and more preferably it is boehmite.

The catalyst support precursor may be shaped into particulate form after the introduction of the maganese compound onto and/or into the catalyst support precursor and preferably before calcination thereof. The shaping may, for example, be carried out by means of spray drying. Prior to shaping the catalyst support precursor, it may be partially dried. The resulting shaped product may then be subjected to the calcination in order to convert the catalyst support precursor to a catalyst support. The calcination may take place prior to introducing the cobalt compound onto and/or into the shaped product. In order to achieve a desired particle size distribution, classification may be performed on the shaped particulate product, using, for example, cyclones or sieves.

However, the catalyst support material is preferably a catalyst support. The catalyst support is preferably as described herein above.

In one embodiment of the invention, the catalyst support or catalyst support precursor may be contacted with the manganese compound prior to introducing the cobalt compound onto and/or into the catalyst support. In this embodiment, the manganese may serve as a support modifier. Preferably, the calcination of the manganese containing catalyst support material also takes place prior to introducing the cobalt compound onto and/or into the catalyst support.

In an alternative embodiment of the invention, the catalyst support or catalyst support precursor may be contacted with the manganese compound during and/or subsequent to introducing the cobalt compound onto and/or into the catalyst support. In this embodiment of the invention, the manganese may serve as a promoter. The calcination of the manganese containing catalyst support material then takes place subsequent to introducing the cobalt compound onto and/or into the catalyst support.

Preferably, the catalyst support or catalyst support precursor is contacted with the manganese compound after the titanium compound has been introduced onto and/or into the catalyst support.

The catalyst support may be as described herein above.

As set out above, the catalyst support material is contacted with a manganese compound. The manganese compound may be an inorganic manganese compound, such as manganese nitrate. Alternatively, it may be an organic manganese compound.

In this specification, an organic manganese compound is a manganese compound wherein manganese is associated with at least one organic group by means of a bond, for instance by means of a covalent bond, a metal-to-ligand coordination or an ionic interaction.

Preferably, in the organic manganese compound, manganese is associated with at least one non-carbon atom of the at least one organic group, in particular with an oxygen atom of the organic group. Preferably, all the groups associated with the manganese are organic groups, and preferably all the said organic groups are associated with the manganese via an oxygen atom. The manganese compound may be manganese(II)acetate tetrahydrate.

The contacting of the catalyst support material with the manganese compound may be by any suitable method including, for example, impregnation, precipitation, adsorption or chemical vapour phase deposition.

Preferably, the contacting of the manganese compound with the catalyst support material is by means of impregnation. A suitable impregnating liquid medium may be used to effect the contact between the manganese compound and the catalyst support material. The impregnation may be incipient wetness impregnation. In a preferred alternative embodiment the impregnation may be slurry phase impregnation. Preferably, the liquid medium is an inorganic liquid medium, such as water. Preferably, the liquid medium is a solvent for the manganese compound.

After impregnation, the excess impregnation liquid medium may be removed, preferably by means of drying. The drying is preferably carried out at sub-atmospheric conditions, preferably from 0.01 to 0.9 bar(a). The drying is preferably carried out at temperature above 25° C., more preferably at a temperature of not more than 125° C.

Co-Hydrolysing the Hydrolysable Manganese Compound and Al(OR")$_3$

It will be appreciated that in the co-hydrolysing embodiment of the invention the catalyst support material that is formed is an aluminium-based catalyst support material.

In the embodiment of co-hydrolysis, the manganese compound is preferably introduced onto and/or into the catalyst support (and preferably also calcined) prior to introducing the cobalt compound onto and/or into the catalyst support. In this embodiment, the manganese may serve as a support modifier.

Co-hydrolysis of the hydrolysable manganese compound and Al(OR")$_3$ may be carried out by mixing the hydrolysable manganese compound and Al(OR")$_3$ and hydrolysing the mixture. Hydrolysis of the mixture may be carried out by adding water to the mixture.

The hydrolysable manganese compound may be a hydrolysable organic manganese compound.

Preferably, the manganese-containing catalyst support material, which is formed by the co-hydrolysis, is manganese-containing boehmite. The manganese-containing boehmite may be dried, and preferably it is shaped into particulate form before calcination thereof.

The shaping may be carried out by means of spray drying. The resulting shaped product is then subjected to the calcination above 180° C. In order to achieve a desired particle size distribution, classification may be performed on the shaped particulate product, using, for example, cyclones or sieves.

In this specification, a hydrolysable organic manganese compound is a manganese compound wherein manganese is associated with at least one oxygen atom of at least one organic group by means of a bond, for instance by means of a covalent bond, a metal to ligand coordination or an ionic interaction.

Calcination of the Manganese-Containing Support Material

The calcination of the manganese-containing catalyst support material may take place in a non-reducing environment, preferably in an oxidizing environment, such as in air. The calcination may be carried out either in a stationary or in a fluidized bed calciner. The calcination may instead take place in a rotary kiln. In a preferred embodiment, the calcination is carried out in a fluidized bed calciner. The calcination may typically take place for a period of 10 minutes to 10 hours.

During the calcination of the manganese-containing catalyst support material prepared by contacting the catalyst support material with the manganese compound, the manganese compound in and/or on the catalyst support material may react and/or it may decompose and/or it may bond chemically to the catalyst support material; however, preferably, the calcination transforms the manganese compound to a manganese oxide, preferably by decomposition and/or reaction. During calcination of the manganese-containing catalyst support material prepared by co-hydrolysis, conversion to aluminium-manganese oxide may take place.

The calcination of the manganese-containing support material is preferably carried out at or above 350° C., preferably at least 400° C., more preferably at above 500° C., still more preferably the calcination is carried out at at least 525° C. Preferably the calcination is carried out below 1200° C., preferably below 950° C.

The Mn level after calcination may be as described herein above.

In one embodiment of the invention, the manganese compound may be introduced onto and/or into the catalyst support (and preferably also calcined) prior to introducing the cobalt compound onto and/or into the catalyst support. In this embodiment, the manganese may serve as support modifier. Alternatively the manganese compound may be introduced onto and/or into the catalyst support during and/or subsequent to introducing the cobalt compound onto and/or into the catalyst support. In this embodiment, the manganese may serve as a promoter.

In a preferred embodiment of the invention, the titanium compound is introduced onto and/or into the catalyst support (and preferably also calcined) prior to introducing the cobalt compound onto and/or into the catalyst support. In this embodiment, the titanium may serve as a support modifier.

The titanium compound and manganese compound may be introduced separately or simultaneously onto and/or into the catalyst support. In one embodiment the manganese compound is introduced onto and/or into the catalyst support before or with introducing the titanium compound onto and/or into the catalyst support. In another embodiment the manganese compound is introduced onto and/or into the catalyst support after the titanium compound has been introduced onto and/or into the catalyst support.

In one embodiment the manganese compound may be introduced onto and/or into the catalyst support which contains the titanium compound, the manganese compound being introduced during and/or subsequent to introducing the cobalt compound onto and/or into the catalyst support which contains the titanium compound. In last-mentioned embodiment, the manganese may serve as a promoter.

Introducing the Cobalt Compound onto and/or into the Catalyst Support

The cobalt compound may be introduced onto and/or into the catalyst support by contacting the cobalt compound with the catalyst support in any suitable manner, but preferably it is by means of impregnation. Preferably, the impregnation is carried out by forming a mixture of the cobalt compound, a liquid carrier for the cobalt compound and the catalyst support.

The liquid carrier may comprise a solvent for the cobalt compound and preferably the said cobalt compound is dissolved in the liquid carrier. The liquid carrier may be water.

The impregnation may be effected by any suitable impregnation method, including incipient wetness impregnation or slurry phase impregnation. Slurry phase impregnation is preferred.

Preferably, the cobalt compound is dissolved in the liquid carrier in order that the volume of the solution is greater than xy litre, which solution is then mixed with the catalyst support, and wherein x is the BET pore volume of the catalyst support in l/kg support, and y is the mass of the catalyst support to be impregnated in kg. Preferably, the volume of the solution is greater than 1.5xy litre ("I"), and preferably it is about 2xy litre.

The impregnation may be carried out at sub-atmospheric pressure, preferably below 85 kPa(a), preferably at 20 kPa(a) and lower. Preferably, the impregnation is also carried out at a temperature above 25° C. The impregnation temperature may be above 40° C., preferably above 60° C., but preferably not above 95° C.

The impregnation may be followed by at least partial drying of the impregnated support, preferably at a temperature above 25° C. The drying temperature may be above 40°

C., preferably above 60° C., but preferably not above 95° C. Preferably, the drying may be effected at sub-atmospheric conditions, preferably below 85 kPa(a), preferably at 20 kPa(a) or lower.

In one embodiment of the invention, the impregnation and at least partial drying of the catalyst support may be carried out using a procedure which includes a first step wherein the catalyst support is impregnated (preferably slurry impregnated) with the cobalt compound at a temperature above 25° C., and at sub-atmospheric pressure, and the resultant product is dried; and at least one subsequent step wherein the resulting, at least partially dried impregnated catalyst support of the first step is subjected to treatment at a temperature above 25° C., and sub-atmospheric pressure such that the temperature of the subsequent step exceeds that in the first step and/or the sub-atmospheric pressure in the subsequent step is lower than that in the first step. This two step impregnation procedure may be as described in WO 00/20116, which is incorporated herein by reference.

A dopant capable of enhancing the reducibility of the cobalt of the cobalt compound may also be introduced onto and/or into the catalyst support. The dopant may be introduced during or after the introduction of the cobalt compound onto and/or into the catalyst support. The dopant may be introduced as a dopant compound which is a compound of a metal selected from the group consisting of palladium (Pd), platinum (Pt), ruthenium (Ru), rhenium (Re) and a mixture of two or more thereof. Preferably, the dopant compound is an inorganic salt, and it is preferably soluble in water. The mass proportion of the metal of the dopant to the cobalt metal may be as set out above.

The cobalt compound introduced onto and/or into the catalyst support may be any suitable cobalt compound. Preferably, it is an inorganic compound, more preferably an inorganic salt of cobalt. The cobalt compound may be cobalt nitrate, and particularly it may be $Co(NO_3)_2 \cdot 6H_2O$.

In an alternative embodiment of the invention, the cobalt compound may be introduced onto and/or into the catalyst support by contacting an insoluble cobalt compound (such as cobalt hydroxide) with the catalyst support, preferably by forming a slurry of particles of the insoluble cobalt compound, with particles of the catalyst support in a carrier liquid; and removing carrier liquid from the slurry to obtain a dried product which is then calcined. The process may also include the step of adding a cobalt compound in the form of a soluble cobalt compound (such as cobalt nitrate). Preferably the soluble cobalt compound is included in the slurry of particles of the insoluble cobalt compound, with particles of the catalyst support in the carrier liquid.

The process may also include the step of introducing an acid, preferably a carboxylic acid, preferably a multi-functional carboxylic acid having the general formula (1)

HOOC—C*R$_1$C*R$_2$—COOH    (1)

or a precursor thereof, where

C* in each of C*R$_1$, and C*R$_2$ is a sp$^2$ carbon, and R$_1$ and R$_2$ are the same or different, and each are selected from the group consisting of hydrogen and an organic group, into and/or onto the catalyst support prior to or simultaneously with the cobalt compound.

Preferably, the ratio of the quantity of carboxylic acid used relative to the support surface area of the catalyst support is at least 0.3 μmol carboxylic acid/m$^2$ of support surface area.

In principle, any multi-functional carboxylic acid complying with formula (1) can be used, or a precursor thereof such as an anhydride. Non-limiting examples of suitable carboxylic acids are maleic acid, mesaconic acid, citraconic acid and fumaric acid. An example of a suitable acid precursor is maleic anhydride. Mixtures of acids of formula (1) or precursors thereof may also be used, as may mixtures of acids of formula (1) or precursors thereof with acids, or precursors thereof, which do not comply with formula (1).

The catalyst support with the cobalt compound thereon and/or therein may be calcined. Preferably the calcination is performed after a drying step. The calcination may be effected in order to decompose the cobalt compound and/or to cause it to react with oxygen. During calcination an oxide or oxides of the cobalt may be formed. For example, a cobalt compound (for example, cobalt nitrate or cobalt hydroxide) may be converted into a compound selected from CoO, CoO(OH), $Co_3O_4$, $Co_2O_3$ or a mixture of two or more thereof.

The calcination may be carried out in any suitable manner such as in a rotary kiln, but preferably it is carried out in a fluidised bed reactor or calciner.

The calcination may be carried out in an inert atmosphere, but preferably it is carried out in an oxidizing atmosphere, preferably in the presence of oxygen, more preferably in air.

Preferably the calcination is carried out at a temperature above 95° C., more preferably above 120° C., still more preferably above 200° C., but preferably not above 400° C., more preferably not above 300° C.

The calcination may be carried out by using a heating rate and an air space velocity that comply with the following criteria:
(i) when the heating rate is ≤1° C./min, the air space velocity is at least 0.76 Nm$^3$/(kg Co(NO$_3$)$_2$·6H$_2$O)/h; and
(ii) when the heating rate is higher than 1° C./min, the air space velocity satisfies the relation:

$$\log \text{(space velocity)} \geq \log 0.76 + \frac{\log 20 - \log 0.76}{2} \log \text{(heating rate)}$$

The impregnation, the at least partial drying and calcination may be repeated to achieve higher loadings of the cobalt compound onto and/or into the catalyst support. In one embodiment of the invention, a first impregnation, drying and calcination procedure may be followed by a partial reduction procedure of the calcined material; and the partially reduced material may then be subjected to a further impregnation, drying and calcination procedure. The partial reduction procedure may be executed with a final temperature of between 100° C. and 300° C.

In one embodiment of the invention, the cobalt compound may be introduced onto and/or into the catalyst support by a method which includes in a first preparation step, impregnating the catalyst support with an organic cobalt compound in a carrier liquid, at least partially drying the impregnated support, and calcining the at least partially dried impregnated support, to obtain a calcined intermediate; and in a second preparation step, impregnating the calcined intermediate from the first preparation step, with an inorganic cobalt compound in a carrier liquid, at least partially drying the impregnated support, and calcining the at least partially dried impregnated support, to obtain the catalyst precursor.

Activation

According to a third aspect of the present invention, there is provided a process for preparing a cobalt-containing catalyst, the process comprising preparing a cobalt-containing catalyst precursor as set out above; and reducing the catalyst precursor, thereby activating the catalyst precursor.

The reduction of the catalyst precursor preferably includes treating it with a reducing gas to activate it. Preferably, the reducing gas is hydrogen or a hydrogen containing gas. The hydrogen containing gas may consist of hydrogen and one or more inert gases which are inert in respect to the active catalyst. The hydrogen containing gas preferably contains at least 90 volume % hydrogen.

The reducing gas may be contacted with the catalyst precursor in any suitable manner. Preferably the catalyst precursor is provided in the form of a bed of particles with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively, the pressure may be from 1.5 bar(a) to 20 bar(a). Preferably, however, the pressure is at about atmospheric pressure.

The reduction is preferably carried out at a temperature above 25° C. at which the catalyst precursor will be reduced to an active form. Preferably, the reduction is carried out at a temperature above 150° C., and preferably below 600° C. Preferably the reduction is carried out at a temperature below 500° C., more preferably below 450° C.

During reduction the temperature may be varied, and preferably it is increased to a maximum temperature as set out above.

The flow of the reducing gas through the catalyst bed is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The reduction may be carried out in two or more steps during which one or both of the heating rate and the space velocity of the reducing gas is varied.

In one embodiment of the invention, the active catalyst may be coated preferably by introducing a mixture of active catalyst particles and a coating medium in the form of a molten organic substance, which is at a temperature $T_1$, and which sets or congeals at a lower temperature $T_2$ so that $T_2<T_1$, into at least one mould; and at least partly submerging the mould in a cooling liquid, so as to cool the organic substance down to a temperature $T_3$, where $T_3 \leq T_2$.

During the reduction, the water partial pressure is preferably kept as low as possible, more preferably below 0.1 atmosphere. The hydrogen space velocity may be from 2 to 4 liters per hour per gram of catalyst.

In one embodiment of the present invention, the process for preparing the cobalt-containing catalyst may include
  in a carbide formation step, treating the activated catalyst, comprising the catalyst support supporting cobalt with a zero valency, with a CO containing gas (preferably at a temperature $T_1$, where $T_1$ is from 200° C. to 280° C.) to convert the cobalt to cobalt carbide thereby obtaining a cobalt carbide containing catalyst precursor; and
  in a subsequent activation step, subjecting the cobalt carbide containing catalyst precursor to treatment with a hydrogen containing gas (preferably at a temperature $T_2$, where $T_2$ is at least 300° C.) to convert the cobalt carbide to cobalt metal thereby activating the cobalt carbide containing catalyst precursor and obtaining a cobalt-containing hydrocarbon synthesis catalyst.

The catalyst is preferably a catalyst as described above.

Hydrocarbon Synthesis

According to a fourth aspect of the present invention there is provided a hydrocarbon synthesis process which comprises preparing a cobalt-containing catalyst as set out above; and contacting hydrogen with carbon monoxide at a temperature above 100° C. and at a pressure of at least 10 bar with the catalyst, to produce hydrocarbons and optionally, oxygenates of hydrocarbons.

Preferably the hydrocarbon synthesis process is a Fischer-Tropsch process, preferably a three phase Fischer-Tropsch process, more preferably a slurry bed Fischer-Tropsch process for producing a wax product.

The water partial pressure in the slurry bed may reach at least 5 bar(a), preferably at least 8 bar(a). The total feed $H_2/CO$ molar ratio may be from 1.4 to 2, preferably about 1.5, alternatively about 1.8. In an alternative embodiment, the water partial pressure in the slurry bed may be below 5 bar(a). The total feed $H_2/CO$ molar ratio may be from 1.4 to 2, preferably about 1.5.

The hydrocarbon synthesis process may also include a hydroprocessing step for converting the hydrocarbons and optionally oxygenates thereof to liquid fuels and/or other chemicals.

According to yet another aspect of the present invention, there is provided products produced by the hydrocarbon synthesis process as described above.

The catalyst as described above may be used to improve the activity stability or activity of a hydrocarbon synthesis process. The improvement may be over a catalyst which does not include titanium and manganese. The titanium and manganese present in the catalyst may reduce the deactivation of the catalyst during hydrocarbon synthesis. The improved activity stability, activity and reduced deactivation may be measured after three days, preferably after 10 days of hydrocarbon synthesis. The titanium and manganese present in the catalyst may serve to reduce methane selectivity and/or may reduce support dissolution of the alumina support during hydrocarbon synthesis.

BRIEF DESCRIPTION OF THE FIGURES

The invention will now be described in more detail, by way of example only, with reference to the accompanying figures in which.

Figure 1:
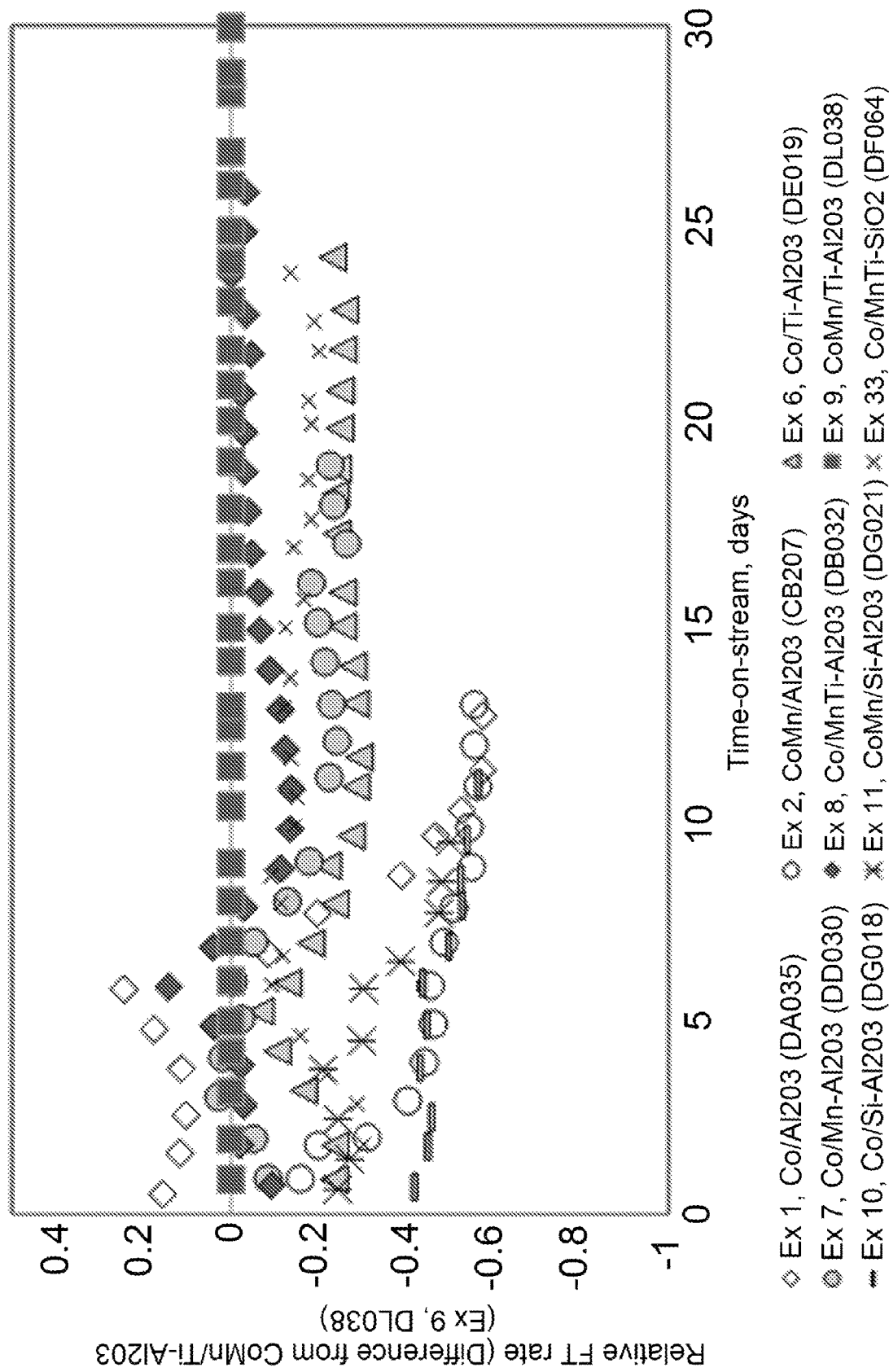
FIG. 1: is a graph showing the FT rate over Examples 1, 2, 6-8, 10, 11 and 33 relative to Example 9.

The foregoing and other objects, features and advantages of the present invention will become more apparent from the following description of certain embodiments of the present invention by way of the following non-limiting examples.

EXAMPLES

The invention will now be described with reference to the following non-limiting experimental examples.

Example 1 (Comparative)—30 g Co/0.04 g Pt/100 g Un-Modified $Al_2O_3$

A cobalt based Fischer-Tropsch synthesis catalyst precursor with the composition 30 g Co/0.04 g Pt/100 g support was prepared using an un-modified $Al_2O_3$ (Puralox with a surface area of 150 m$^2$/g—hereinafter referred to as Puralox) support.

In a first impregnation step $Co(NO_3)_2.6H_2O$ (79.0 g) and $(NH_4)_3Pt(NO_3)_2$ (0.026 g) were dissolved in distilled water (100 g). Carboxylic acid in the amount of about 0.03 moles/100 g support was dissolved in this solution. Puralox (100 g) was then added to this mixture and the excess water removed under reduced pressure using the drying profile in Table 1 to obtain a free flowing powder.

TABLE 1

Drying profile for impregnated support

| Temperature (° C.) | Pressure (mbar) | Time (min) |
|---|---|---|
| 60 | 250 | 15 |
| 75 | 250 | 30 |
| 85 | 250 | 30 |
| 85 | 250-130 | 120 |
| 85 | 130-50 | 15 |
| 85 | 50 | 180 |

The free flowing powder was then calcined in a fluidised bed calciner with a heating ramp rate of 1° C./min to 250° C. with a hold time of 6 hours, using a GHSV of 2.5 Nm$^3$/kgCo(NO$_3$)$_2$.6H$_2$O/hour.

Then, in a second impregnation stage, the above steps were repeated using $Co(NO_3)_2.6H_2O$ (56.8 g) and $[Pt(NH_4)_4(NO_3)_2]$ (0.042 g) dissolved in water (100 g). The previously calcined material (100 g) was added to this mixture and the excess water removed under reduced pressure using the drying profile in Table 1 to obtain a free flowing powder. The free flowing powder was then again calcined in a fluidised bed calciner with a heating ramp rate of 1° C./min to 250° C. with a hold time of 6 hours, using a GHSV of 2.5 Nm$^3$/kgCo(NO$_3$)$_2$.6H$_2$O/hour.

Example 2 (Comparative)—30 g Co/0.04 g Pt/3.1 g Mn/100 Un-Modified $Al_2O_3$ (Mn as Promoter)

A cobalt based Fischer-Tropsch synthesis catalyst precursor was prepared as described in Example 1.

In this example, manganese was added as a catalyst promoter. After the second impregnation stage, $Mn(NO_3)_2.4H_2O$ (10.1 g) was dissolved in water (100 g) and added to the calcined material (100 g). The excess water was removed under reduced pressure using the drying profile in Table 1 to obtain a free flowing powder. The free flowing powder was then again calcined in a fluidised bed calciner with a heating ramp rate of 1° C./min to 250° C. with a hold time of 6 hours, using a GHSV of 2.5 Nm$^3$/kgCo(NO$_3$)$_2$.6H$_2$O/hour.

Example 3 (Comparative)—Ti—$Al_2O_3$ (Puralox) Support (Ti as Modifier)

Titanium(IV)iso-propoxide (17.2 g) was added to dry ethanol (78.9 g) and allowed to mix for 10 minutes. $Al_2O_3$ (Puralox) (100 g) was added to this solution and allowed to mix for a further 10 minutes. Following this, the ethanol was removed under reduced pressure using the drying profile in Table 2 to obtain a free flowing powder.

TABLE 2

Drying profile for the Ti impregnated Puralox material

| Pressure (mbar) | Temperature (° C.) | Time (min) |
|---|---|---|
| 842 | 60 | 10 |
| 500 | 60 | 30 |
| 400 | 60 | 30 |
| 300 | 60 | 30 |
| 200 | 60 | 60 |
| 100 | 60 | 60 |
| 50 | 60 | 60 |

After the drying step, the modified support was calcined in a fluidized bed calciner with a GHSV of 2.5 Nm$^3$/kg support/hour using air as the calcination gas using a heating rate of 1° C./min to 425° C. with no hold step at this temperature. After this fluidised bed calcination step, the support material was calcined further in a muffle oven to 550° C. at a heating rate of 5° C./min and a final hold time of 5 hours. The resulting modified support included 2.6 g Ti/100 g $Al_2O_3$.

Example 4 (Comparative)—Mn—$Al_2O_3$ (Puralox) Support (Mn as Modifier)

Manganese(II)acetate tetrahydrate (13.8 g) was dissolved in water (80-100 g) and mixed for 10 minutes. $Al_2O_3$ (Puralox) (100 g) was added to this solution and mixed for a further 10 minutes. Following this, the water was removed under reduced pressure using the drying profile in Table 3 to obtain a free flowing powder.

TABLE 3

Drying profile for the Mn impregnated Puralox material

| Pressure (mbar) | Temperature (° C.) | Time (min) |
|---|---|---|
| 100 | 85 | 60 |
| 50 | 85 | 180 |

After the drying step, the modified support was calcined in a fluidized bed calciner with a GHSV of 2.5 Nm$^3$/hour/kg support using air as the calcination gas using a heating rate of 1° C./min to 425° C. with no hold step at this temperature. After this fluidised bed calcination step, the respective support material was calcined further in a muffle oven to 550° C. at a heating rate of 5° C./min and a final hold time of 5 hours. The resulting modified support included 3.1 g Mn/100 g $Al_2O_3$.

Example 5—MnTi—$Al_2O_3$(Puralox) Support (Mn and Ti as Modifiers)

The Ti—$Al_2O_3$ support obtained from Example 3, was impregnated with manganese(II)acetate tetrahydrate as described in Example 4. The resulting modified support included 2.6 g Ti/3.1 g Mn/100 g $Al_2O_3$.

Example 6 (Comparative)—30 g Co/0.075 g Pt/100 g Ti—$Al_2O_3$ (Ti as Modifier)

A cobalt based Fischer-Tropsch synthesis catalyst precursor with the composition 30 g Co/0.075 g Pt/100 g support was prepared as described in Example 1, however, Ti—$Al_2O_3$ support as described in Example 3 was used.

Example 7 (Comparative)—30 g Co/0.075 g Pt/100 g Mn—Al$_2$O$_3$ (Mn as Modifier)

A cobalt based Fischer-Tropsch synthesis catalyst precursor with the composition 30 g Co/0.075 g Pt/100 g support was prepared as described in Example 1. However, no carboxylic acid was added during catalyst preparation. Mn—Al$_2$O$_3$ support as described in Example 4 was used.

Example 8 (Inventive)—30 g Co/0.075 g Pt/100 g MnTi—Al$_2$O$_3$(Ti and Mn as Modifiers)

A cobalt based Fischer-Tropsch synthesis catalyst precursor with the composition 30 g Co/0.075 g Pt/100 g support was prepared as described in Example 1. However, no carboxylic acid was added during catalyst preparation. MnTi—Al$_2$O$_3$ support as described in Example 5, was used.

Example 9 (Inventive)—30 g Co/0.075 g Pt/3.1 g Mn/100 g Ti—Al$_2$O$_3$(Ti as Modifier and Mn as Promoter)

A cobalt based Fischer-Tropsch synthesis catalyst precursor with the composition 30 g Co/0.075 g Pt/3.1 g Mn/100 g support was prepared as described in Example 2, however, Ti—Al$_2$O$_3$ support as described in Example 3, was used.

Example 10 (Comparative)—30 g Co/0.04 g Pt/100 g Si—Al$_2$O$_3$(Si as Modifier)

A cobalt based Fischer-Tropsch synthesis catalyst precursor with the composition 30 g Co/0.04 gPt/100 g support was prepared as described in Example 1. 2.1 g Si/100 g Al$_2$O$_3$ support was used. TEOS (tetra ethoxy silane) was used as starting material for the support modification.

Example 11 (Comparative)—30 g Co/0.04 g Pt/3.1 g Mn/100 Si—Al$_2$O$_3$(Si as Modifier and Mn as Promoter)

A cobalt based Fischer-Tropsch synthesis catalyst precursor was prepared as described in Example 10. However, during the second impregnation stage, Co(NO$_3$)$_2$.6H$_2$O (56.8 g), [Pt(NH$_4$)$_4$(NO$_3$)$_2$] (0.042 g) and Mn(NO$_3$)$_2$.4H$_2$O (11.6 g) was dissolved in water (100 g) and added to the calcined material obtained in the first impregnation stage (100 g).

Example 12 (Comparative)—30 g Co/0.075 g Pt/100 g Ti—Al$_2$O$_3$ (Ti as Modifier)

A cobalt based Fischer-Tropsch synthesis catalyst precursor with the composition 30 g Co/0.075 gPt/100 g support was prepared as described in Example 1, however, no carboxylic acid was added during catalyst preparation. Ti—Al$_2$O$_3$ was used and was prepared as described in Example 3.

Example 13 (Comparative)—30 g Co/0.075 g Pt/100 g Ti—Al$_2$O$_3$ (Ti as Modifier)

A cobalt based Fischer-Tropsch synthesis catalyst precursor was prepared as described in Example 12. However, 5 g Ti/100 g Al$_2$O$_3$ support was used and was prepared as described in Example 3.

Example 14 (Comparative)—30 g Co/0.075 g Pt/100 g Ti—Al$_2$O$_3$(Ti as Modifier)

A cobalt based Fischer-Tropsch synthesis catalyst precursor was prepared as described in Example 12. However, 10 g Ti/100 g Al$_2$O$_3$ support was used and was prepared as described in Example 3.

Example 15—Reduction

The calcined catalyst precursors were reduced prior to Fischer-Tropsch synthesis using pure H$_2$ flowing at 2.0 Nm$^3$/kg Catalyst/hour at atmospheric pressure. The following heating profile was used, 1° C./min to 110° C. hold 3 hours followed with, 1° C./min to 425° C. hold 10 hours. The reduced catalyst was cooled down to room temperature and suspended into molten wax and loaded in a CSTR under an inert gas blanket (argon or nitrogen).

Example 16—Fischer-Tropsch Synthesis

The activated and wax protected catalysts, as described in Example 15, were tested for their slurry phase FTS performance in a laboratory micro slurry CSTR at a reactor temperature of 230° C. and a reactor pressure of about 22 bar during which a pure H$_2$ and CO and Ar feed gas mixture was utilised with a ~5% Ar content and a total feed molar H$_2$/CO ratio of about 1.8. This reactor was electrically heated and sufficiently high stirrer speeds were employed as to eliminate any gas-liquid mass transfer limitations. The feed gas space velocity was changed such that the syngas conversion was around 78±1%. The water partial pressure was about 10 bar.

Discussion

Example 9 (Co/3.1 g Mn/100 g Ti—Al$_2$O$_3$) showed initial catalyst deactivation, however, after 5 days on-line the catalyst performance stabilized and remained stable over a 50 day period FIG. 1 shows the percentage difference in FT rate for Examples 1, 2, 6-8, 10, 11 and 33 relative to Example 9 and can be calculated as (FT rate of Ex. 1, 2, 6-8, 10, 11 or 33—FT rate of Ex. 9)/FT rate of Ex. 9. As can be seen, Example 2 (Co/3.1 g Mn/100 g un-modified Al$_2$O$_3$) shows that the addition of manganese as catalyst promoter did not improve the activity stability of the catalyst relative to Example 1 (the un-promoted and un-modified catalyst sample), with time on-line. This trend was also observed in comparing catalysts containing the Si-modified Al$_2$O$_3$ support, promoted with manganese as in Example 11 (Co/3.1 g Mn/100 g Si—Al$_2$O$_3$) with Example 10 (Co/100 g Si—Al$_2$O$_3$).

However, Example 6 (Co/100 g Ti—Al$_2$O$_3$) and Example 7 (Co/100 g Mn—Al$_2$O$_3$) showed that titanium and manganese as Al$_2$O$_3$ support modifiers respectively, resulted in an enhancement in activity and activity stability relative to Example 1, the un-promoted and un-modified catalyst sample.

Turning to Example 7, this Example showed black wax, which is an indication of catalyst break-up. This was not observed for the catalysts containing the combination of titanium and manganese support modifications (Example 8, Co/100 g MnTi—Al$_2$O$_3$).

Even more surprisingly, the catalysts containing the combination of titanium and manganese, either manganese added as support modifier (Example 8) or catalyst promoter (Example 9), showed a significant enhancement in activity and activity stability relative to Examples 1, 2, 6, 7, 10 and 11.

Figure 2:
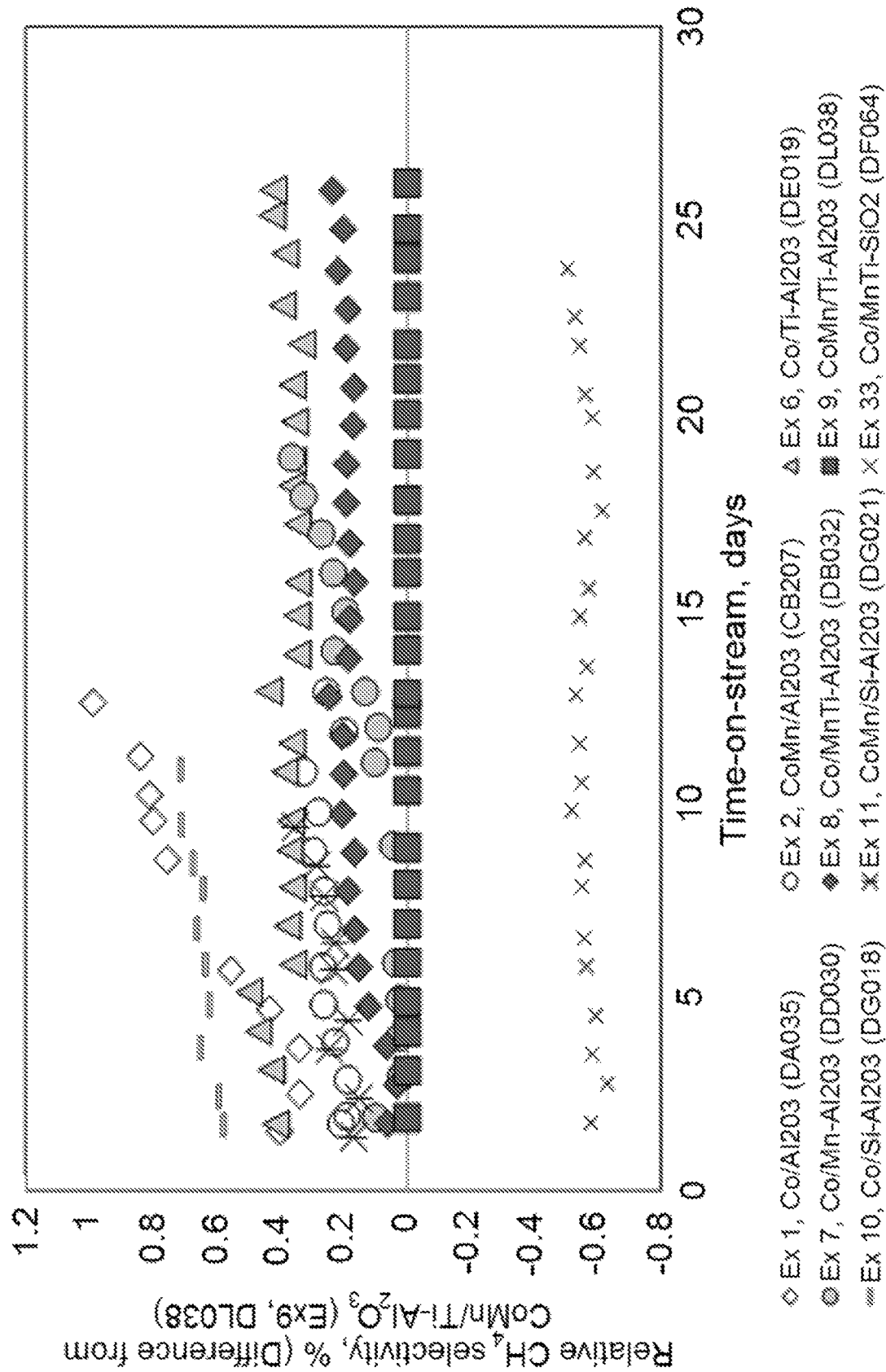
FIG. 2: is a graph showing methane selectivity over Examples 1, 2, 6-8, 10, 11 and 33 relative to Example 9.

The percentage difference in methane selectivity over the Examples 1, 2, 6-8, 10, 11 and 33 relative to Example 9, is shown in FIG. 2 and can be calculate as (% $CH_4$ selectivity of Ex. 1, 2, 6-8, 10, 11 or 33-% $CH_4$ selectivity of Ex. 9)/% $CH_4$ selectivity of Ex. 9. As can be seen, Examples 8 and 9 containing the Mn/Ti combination showed lower and stable methane selectivity over time compared to the rest of the tested catalysts samples. Example 7, containing the Mn-modified $Al_2O_3$, showed initial low methane selectivity, which increased to the methane selectivity observed for Example 6, containing the Ti-modified $Al_2O_3$ support.

Table 4 below shows the FT performance over Examples 12-14 relative to the initial activities. These samples were prepared using Ti-modified $Al_2O_3$ with varying levels of Ti modification. As can be seen, increasing the Ti content from 2.6 g Ti/100 g $Al_2O_3$ to 10 g Ti/100 g $Al_2O_3$ did not result in a relative improvement in activity stability of the catalysts compared to that of Example 12. The catalysts containing the higher loading Ti resulted in lower activity stability with time on-line.

TABLE 4

The relative FT rate[1] over Examples 12-14 tested under conditions as described in Example 16

| Time on-stream, days | Example 12, (2.6 g Ti/100 g $Al_2O_3$) | Example 13, (5 g Ti—$Al_2O_3$) | Example 14, (10 g Ti—$Al_2O_3$) |
|---|---|---|---|
| 1 | 1 | 1 | 1 |
| 19 | 0.53 | 0.38 | 0.37 |

[1]Relative to the initial FT rate ((CO + $CO_2$) μmol/CO/gs)) and Error is 5% e.g. 1 ± 0.05

Example 17—Fischer-Tropsch Synthesis

The activated and wax protected catalysts, as described in Example 15, for Examples 8 and 9 were tested for their slurry phase FTS performance in a laboratory micro slurry CSTR at a reactor temperature of 230° C. and a reactor pressure of about 19 bar during which a pure $H_2$, CO and Ar feed gas mixture was utilised with a 10% Ar content and a total feed molar $H_2$/CO ratio of ~1.5.

This reactor was electrically heated and sufficiently high stirrer speeds were employed as to eliminate any gas-liquid mass transfer limitations. The feed gas space velocity was changed such that the syngas conversion was around 72±1%. The water partial pressure was about 6 bar.

Examples 8 and 9 were tested under the conditions described in Example 17. As can be seen from Table 5, Example 8, containing the MnTi support modification and Example 9 (containing Mn as promoter and Ti as support modifier) showed comparable relative FT activities and methane selectivities with time on-line, showing the beneficial effect of the combination of MnTi and adding Mn as catalyst promoter or support modifier under the FT conditions.

TABLE 5

FT performance over Examples 8 and 9 with time on-line under conditions as described in Example 17

| Time on-stream, days | Relative FT rate[1] | Relative $CH_4$ selectivty[2] |
|---|---|---|
| Example 8, Co/MnTi—$Al_2O_3$ | | |
| 1 | 1 | 1 |
| 9 | 0.8 | 0.88 |
| 30 | 0.71 | 0.86 |
| Example 9, CoMn/Ti—$Al_2O_3$ | | |
| 1 | 1 | 1 |
| 8 | 0.78 | 0.89 |
| 30 | 0.67 | 0.84 |

[1]Relative to the initial FT rate ((CO + $CO_2$) μmol/CO/gs)) and Error is 5% e.g. 1 ± 0.05
[2]Drift in % $CH_4$ selectivity relative to day 1; C % excluding $CO_2$ formation and Error is 0.3 percentage points, e.g. 5.8 ± 0.3

Example 18 (Comparative)—30 g Co/0.075 g Pt/100 g Mn—$Al_2O_3$

A cobalt based Fischer-Tropsch synthesis catalyst precursor with the composition 30 g Co/0.075 gPt/100 g support was prepared as described in Example 1. However, no carboxylic acid was added during catalyst preparation. Mn—$Al_2O_3$ support as described in Example 4 was used. However, the resulting modified support consisted of 2.1 g Mn/100 g $Al_2O_3$.

Example 19 (Comparative)—30 g Co/0.075 g Pt/100 g Mn—$Al_2O_3$

A cobalt based Fischer-Tropsch synthesis catalyst precursor with the composition 30 g Co/0.075 g Pt/100 g support was prepared as described in Example 1. However, no carboxylic acid was added during catalyst preparation. Mn—$Al_2O_3$ support as described in Example 4 was used. However, the resulting modified support consisted of 7.5 g Mn/100 g $Al_2O_3$.

Example 20 (Comparative)—30 g Co/0.075 g Pt/100 g Mn—$Al_2O_3$

A cobalt based Fischer-Tropsch synthesis catalyst precursor with the composition 30 g Co/0.075 g Pt/100 g support was prepared as described in Example 1. However, no maleic acid was added during catalyst preparation. Mn—$Al_2O_3$ support as described in Example 4 was used. However, the resulting modified support consisted of 10 g Mn/100 g $Al_2O_3$.

Example 21—Fischer-Tropsch Synthesis

The activated and wax protected catalysts, as described in Example 15, for Examples 18-20 were tested for their slurry phase FTS performance in laboratory micro slurry CSTR. The pressure was increased to 18 bar and the temperature to 230° C., where after the synthesis was introduced.

The synthesis feed gas consisted of hydrogen, carbon monoxide and it contained 10% argon as an internal standard with a total feed molar $H_2$/CO ratio of ~1.6. This reactor was electrically heated and sufficiently high stirrer speeds were employed so as to eliminate any gas-liquid mass transfer limitations. The % $H_2$+CO conversion were maintained at 60%±2, by controlling the feed flow by means of Brooks mass flow controllers. The water partial pressure was about 5 bar.

Table 6 shows the relative FT performance over Examples 18-20. These samples were prepared using Mn-modified $Al_2O_3$ with varying levels of Mn modification. No beneficial effect was observed with the increased Mn content from 2.1 g Mn/100 g $Al_2O_3$ to 10 g Mn/100 g $Al_2O_3$. An increase in Mn levels resulted in a significant drift (decrease) in the FT rates with time on-stream.

TABLE 6

The relative FT rate[1] over Examples 18-20 tested under conditions as described in Example 21

| Time on-line, days | Example 18, (2.1 g Mn/100 g $Al_2O_3$) | Example 19, (7.5 g Mn/100 g $Al_2O_3$) | Example 20, (10 g Mn/100 g $Al_2O_3$) |
|---|---|---|---|
| 1 | 1 | 1 | 1 |
| 5 | 0.94 | 0.72 | 0.45 |

[1]Relative to the initial FT rate ((CO + $CO_2$) μmol/CO/gs)) and Error is 5% e.g. 1 ± 0.05

Example 22 (Comparative)—MnSi—$Al_2O_3$ (Puralox) Support

The Si—$Al_2O_3$ support as described in Example 10 was impregnated with manganese(II)acetate tetrahydrate as described in Example 4. The resulting modified support consisted of 3 g Mn/100 g $SiAl_2O_3$.

Example 23 (Comparative)—MnSi—$Al_2O_3$ (Puralox) Support

The Si—$Al_2O_3$ support as described in Example 10 was impregnated with manganese(II)acetate tetrahydrate as described in Example 4. The resulting modified support consisted of 5 g Mn/100 g Si—$Al_2O_3$.

Example 24 (Conductivity Measurements)

Figure 3:
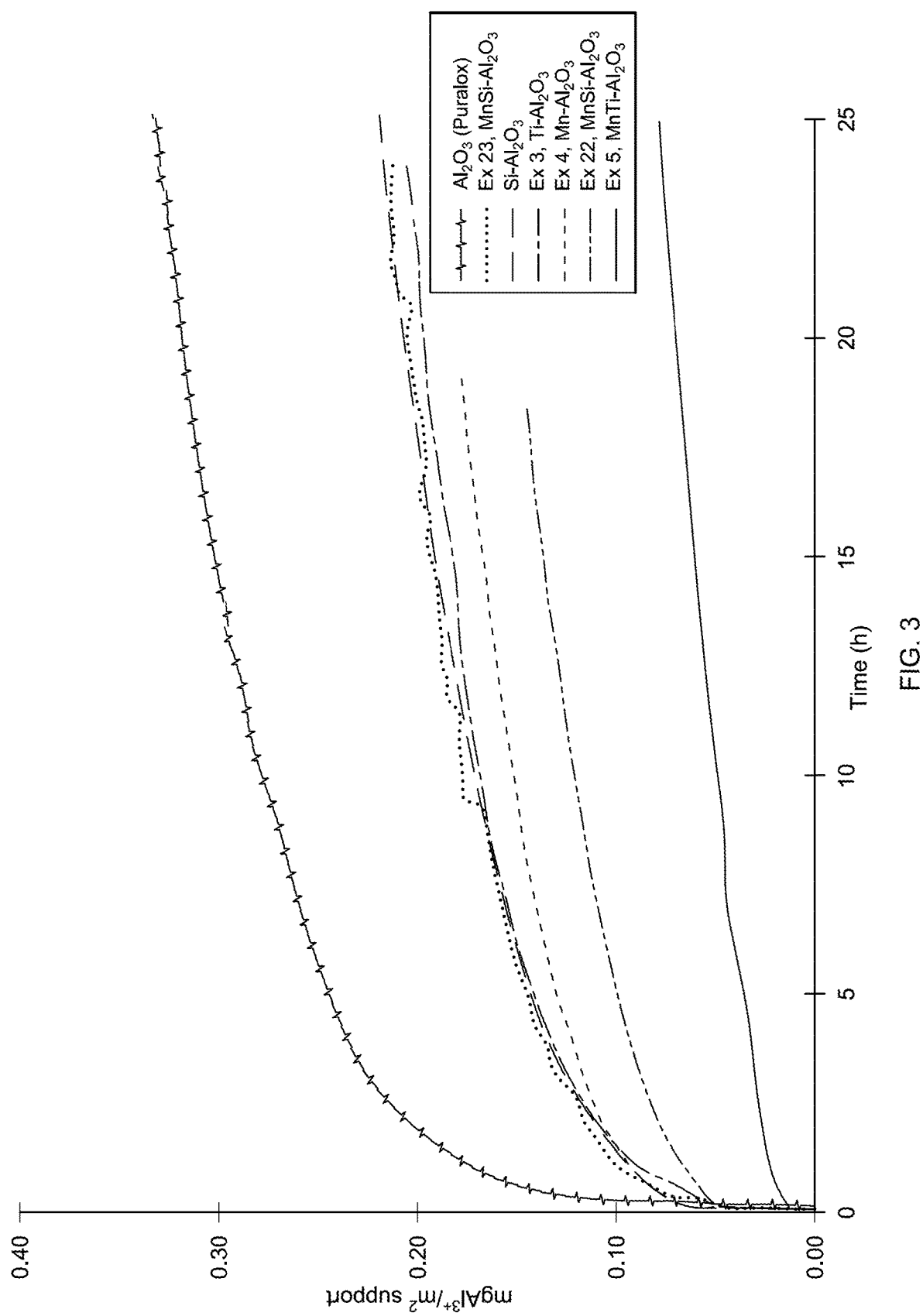
FIG. 3: is a graph depicting cumulative Al dissolution as a function of time for the Mn-modified, Ti-modified, MnTi-modified, unmodified alumina, Si—$Al_2O_3$ and MnSi—$Al_2O_3$ supports.

Alumina dissolves in an aqueous medium at low pH. The dissolution of alumina results in the formation of aluminium ions. As more and more alumina dissolves, the concentration of aluminium increases with time. An increase in aluminium with time was followed by monitoring the conductivity at a constant pH of 2. The pH was kept constant by automated addition of a 10% nitric acid solution. The results are given in FIG. 3 for the modified and un-modified $Al_2O_3$.

The Ti (Example 3), Mn (Example 4) and Si modified $Al_2O_3$ supports exhibited very similar Al-dissolution behaviour over time. The MnSi modification of the $Al_2O_3$ (Example 22) resulted in a decrease in the Al-dissolution. However, a further increase in the Mn loading (Example 23) negated the suppression of the Al-dissolution and resulted in the Al-dissolution behaviour similar to the Si-modified $Al_2O_3$ support. Surprisingly, it can be seen that over the MnTi-modified support (Example 5) the Al-dissolution was significantly suppressed relative to the MnSi modified $Al_2O_3$ (Example 22).

Example 25 (Inventive)—30 g Co/0.075 g Pt/3.1 g Mn/100 g (2.6 g Ti/100 g $Al_2O_3$) (Co-Hydrolysis, Ti as Modifier and Mn as Promoter), C4639

A cobalt based Fisher-Tropsch synthesis catalyst precursor with the composition 30 g Co/0.075 g Pt/3.1 g Mn/100 g (2.6 g Ti/100 g $Al_2O_3$) was prepared as described in Example 9, however the Ti—$Al_2O_3$ support used in Example 9 was replaced with a titanium-containing support that was prepared via co-hydrolysis of titanium (IV) 2-ethylhexoxide and Al-hexanolate as described in Example 37 of WO2014020507.

Example 26 (Inventive)—30 g Co/0.075 g Pt/3.1 g Mn/100 g (2.6 g Ti/100 g $Al_2O_3$ (Calcined PURAL 200™ as the Support, Ti as Modifier and Mn as Promoter), C4685

A cobalt based Fisher-Tropsch synthesis catalyst precursor was prepared with the composition 30 g Co/0.075 g Pt/3.1 g Mn/100 g (2.6 g Ti/100 g $Al_2O_3$) as described in Example 9, however, the Puralox used in Example 9 was replaced with calcined PURAL 200™ which has a pore diameter similar to the pore diameter of the support of Example 25 and has a surface area of about 90 $m^2$/g.

Example 27—Reduction and Fischer-Tropsch Synthesis (FTS)

The calcined catalyst precursors of Examples 25 and 26 were reduced and suspended into molten wax as described in Example 15. The FTS performance of the activated and wax protected catalysts of Examples 25 and 26 were evaluated in a fix bed reactor at 230° C. and a reactor pressure of about 16 bar utilizing a feed gas mixture with an inlet molar $H_2$/CO ratio of about 1.6. The feed gas space velocity was changed such that the syngas conversion was ~62%-65%.

Discussion

Table 7 shows that similar FTS catalyst performance results were obtained in comparing the Co/Pt/Mn/Ti—$Al_2O_3$ catalyst sample prepared via co-hydrolysis of the Ti-modified support (Example 25) with Example 26 (slurry impregnation of Ti), demonstrating that co-hydrolysis of the Ti-modified support is an alternative to slurry impregnation of titanium on alumina.

TABLE 7

FT performance over Examples 25 and 26 under conditions as described in Example 27

| | $CH_4$ selectivity[1] | | |
|---|---|---|---|
| Time on-line, days | Example 25, C4639[2] Co/Pt/Mn/ Ti—$Al_2O_3$ with co-hydrolysis | Example 26, C4685[2] Co/Pt/Mn/ Ti—$Al_2O_3$ with slurry impregnation | % difference in absolute $CH_4$ selectivity between Ex 25 and Ex 26[3] |
| 1 | 1.00 | 1.00 | 0.06 |
| 2 | 1.00 | 1.02 | 0.03 |
| 3 | 1.01 | 1.01 | 0.07 |
| 7 | 1.05 | | |
| | Relative FT rate[4] | | % difference in absolute FT rates between Ex 25 and Ex 26[5] |
| 1 | 1.00 | 1.00 | 0.14 |
| 2 | 0.97 | 0.97 | 0.15 |
| 3 | 0.93 | 0.94 | 0.13 |
| 7 | 0.88 | | |

[1]C % excluding $CO_2$ formation
[2]Drift in % $CH_4$ selectivity relative to day 1
[3]% $CH_4$ selectivity (sel) difference between C4639 and C4685 = (% $CH_4$ sel of C4639 − % $CH_4$ sel of C4685)/% $CH_4$ sel of C4685
[4]Relative to the initial FT rate ((CO + $CO_2$) μmol/CO/gs))
[5]% difference in FT rates between C4639 and C4685 = (FT rate of C4639 − FT rate of C4685)/FT rate of C4685

Example 28: (Comparative)—30 g Co/0.075 g Pt/5 g Ni/100 g (2.6 q Ti/100 g Al$_2$O$_3$) (Ti as Modifier and Ni as Promoter), C4140

Co(NO$_3$)$_2$.6H$_2$O (11.9 g), (NH$_3$)$_4$Pt(NO$_3$)$_2$ (0.0075 g) and Ni(NO$_3$)$_2$.6H$_2$O (1.9 g) were dissolved in water (13 ml for Co, 2 ml for Pt, 2 ml for Ni). The pH of the solution was adjusted to 2.3. 15 g of the Ti-modified Puralox support as described in Example 3 was added and the excess water removed under reduced pressure using the drying profile in Table 8 to obtain a free flowing powder.

TABLE 8

| Drying profile | | |
| --- | --- | --- |
| Pressure (mbar) | Temperature (° C.) | Time (min) |
| Atmospheric | 60 | 10 |
| 280 | 60 | 30 |
| 280 | 75 | 90 |
| 280 | 85 | 60 |
| 50 | 85 | 60 |
| 50 | 90 | 120 |

20 g of the free flowing sample was calcined in a vertical furnace using an air flow of 1000 ml/min and a heating rate of 1° C./min to 250° C. with a hold time of 6 hours. The above steps were repeated in a second impregnation stage by dissolving Co(NO$_3$)$_2$.6H$_2$O (6.8 g), (NH$_3$)$_4$Pt(NO$_3$)$_2$ (0.01 g) and Ni(NO$_3$)$_2$.6H$_2$O (1.2 g) in water (9 ml for Co, 2 ml for Pt, 3 ml for Ni). The previously calcined (first impregnation stage) material (12 g) was added to the mixture and the excess water removed under reduced pressure using the drying profile in Table 8. 15 g of the free flowing sample was calcined in a vertical furnace using an air flow of 750 ml/min and a heating rate of 1° C./min to 250° C. with a hold time of 6 hours.

Example 29: (Inventive)—30 g Co/0.075 g Pt/3.1 g Mn/100 g (2.6 g Ti/100 g Al$_2$O$_3$) (Ti as Modifier and Mn as Promoter—Similar to Example 9, but with Smaller Quantities and Different Drying Profile), C4144

Co(NO$_3$)$_2$.6H$_2$O (13.3 g) and (NH$_3$)$_4$Pt(NO$_3$)$_2$ (0.0075 g) were dissolved in water (13 ml for Co, 3 ml for Pt). The pH of the solution was adjusted to 2.3. 15 g of the Ti-modified Puralox support as described in Example 3 was added and the excess water removed under reduced pressure using the drying profile in Table 9 to obtain a free flowing powder.

TABLE 9

| Drying profile | | |
| --- | --- | --- |
| Pressure (mbar) | Temperature (° C.) | Time (min) |
| Atmospheric | 60 | 10 |
| 280 | 60 | 30 |
| 250 | 75 | 30 |
| 250 | 85 | 30 |
| 250-130 | 85 | 120 gradient |
| 130-50 | 85 | 15 gradient |
| 50 | 85 | 180 |

20 g of the free flowing sample was calcined in a vertical furnace using an air flow of 1000 ml/min and a heating rate of 1° C./min to 250° C. with a hold time of 6 hours. In a second impregnation stage, the above steps were repeated using Co(NO$_3$)$_2$.6H$_2$O (5.75 g) and (NH$_3$)$_4$Pt(NO$_3$)$_2$ (0.01 g) as well as Mn(NO$_3$)$_2$.4H$_2$O (1.4 g) by dissolving it in water (10 ml for Co, 2 ml for Pt, 3 ml for Mn). 12 g of the first impregnation stage calcined material was added to the mixture and the excess water was removed under reduced pressure using the drying profile of Table 9 to obtain a free flowing powder. 15 g free flowing sample was calcined in a vertical furnace using an air flow of 750 ml/min and a heating rate of 1° C./min to 250° C. with a hold time of 6 hours.

Example 30—Reduction and Fischer-Tropsch Synthesis (FTS)

The calcined catalyst precursors of Examples 28 and 29 were reduced and suspended into molten wax as described in Example 15. The FTS performance of the activated and wax protected catalysts of Examples 28 and 29 were evaluated in a fix bed reactor at 230° C. as described in Example 27.

Discussion

It is known that nickel can be a used as an activity stability promoter [Ind. Eng. Chem. Res. 2010, 49, 4140-4148 and U.S. Pat. No. 8,143,186]. However, the addition of Ni as promoter to the Co/Pt/Ti—Al$_2$O$_3$ FTS catalyst did not demonstrate the same Co FTS catalyst performance as when Mn was used as promoter. Mn as promoter resulted in lower methane selectivity with higher activity compared to Ni as promoter. Table 10 illustrates the extent of deactivation of the catalysts as described in Example 28 and Example 29 relative to its initial activity as well as the drift in methane selectivity obtained over catalysts as prepared in Example 28 and 29 and activated and tested as described in Example 30 relative to its initial methane selectivity.

TABLE 10

FTS performance over Example 28 (Co/Pt/Ni//Ti—Al$_2$O$_3$) and Example 29 (Co/Pt/Mn/Ti—Al$_2$O$_3$) with time-on-line_under conditions as described in Example 30

| | CH$_4$ selectivity[1] | | |
| --- | --- | --- | --- |
| Time on-line, days | Example 28, C4140[2] Co/Pt/Ni/ Ti—Al$_2$O$_3$ | Example 29, C4144[2] Co/Pt/Mn/ Ti—Al$_2$O$_3$ | % difference in absolute CH$_4$ selectivity between Ex 28 and Ex 29[3] |
| 1 | 1.00 | 1.00 | 0.78 |
| 3 | 0.94 | 1.03 | 0.64 |
| 5 | 0.93 | 1.04 | 0.59 |
| 10 | | 1.04 | |

| | Relative FT rate[4] | | % difference in absolute FT rates between Ex 28 and Ex 29[5] |
| --- | --- | --- | --- |
| 1 | 1.00 | 1.00 | −0.27 |
| 3 | 1.10 | 0.93 | −0.14 |
| 5 | 1.17 | 0.92 | −0.08 |
| 10 | | 0.88 | |

[1]C % excluding CO$_2$ formation
[2]Drift in % CH$_4$ selectivity relative to day 1
[3]% CH$_4$ selectivity (sel) difference between C4140 and C4144 = (% CH$_4$ sel of C4140 − % CH$_4$ sel of C4144)/% CH$_4$ sel of C4144
[4]Relative to the initial FT rate ((CO + CO$_2$) μmol/CO/gs))
[5]% difference in FT rates between C4140 and C4144 = (FT rate of C4140 − FT rate of C4144)/FT rate of C4144

Example 31: (Inventive)—30 g Co/0.075 g Pt/3.1 g Mn/100 g (2.6 q Ti/100 $Al_2O_3$) with Ti as Modifier and Mn as Promoter Using Ahydrothermal Deposition Method (HDM), C4585

$Co(NO_3)_2.6H_2O$ (37.2 g), $(NH_3)_4Pt(NO_3)_2$ (0.07 g), $Mn(NO_3)_2.4H_2O$ (7.06 g) and carboxylic acid (1.25 g) were dissolved in 75 ml water. Cobalt hydroxide (3 g) was added to the nitrate solution where after 50 g of the Ti-modified Puralox support as described in Example 3 was added. An additional 3 g of $Co(OH)_2$ was added to the slurry and mixed at 95° C. in a rotary evaporator at 65 rpm. Additional 3 g of $Co(OH)_2$ was added until the desired loading of 11.8 g was reached. The mixture was stirred until complete absorption of $Co(OH)_2$ (for approximately 3 hours). The excess water was removed under reduced pressure using the drying profile of Table 11 to obtain a free flowing powder and calcined at 250° C. at a heating rate of 1° C./min in air (2500 ml/min/gcat) for 6 hours.

TABLE 11

| Drying profile | | |
|---|---|---|
| Pressure (mbar) | Temperature (° C.) | Time (min) |
| 500-130 | 95 | 180 |
| 50 | 100 | 120 |

The calcined catalyst precursor was reduced and suspended into molten wax as described in Example 15. The catalyst was tested for its slurry phase FTS performance in a laboratory micro slurry CSTR as described in Example 17.

As can be seen from Table 12, Example 31, prepared using HDM, showed lower methane selectivity and higher activity when comparing the absolute $CH_4$ selectivity and reaction rates with Example 9 (the cobalt nitrate slurry impregnation method). The drift in methane selectivity of Example 31 is slightly more than Example 9, but the deactivation relative to day 1 over time on stream of Example 31 and Example 9 are comparable.

TABLE 12

FTS performance over Example 31 (Co/Pt/Mn/Ti—$Al_2O_3$ - prepared using HDM) with time-on-line under conditions as described in Example 17)

| | $CH_4$ selectivity[1] | | |
|---|---|---|---|
| Time on-line, days | Example 31, C4585[2] Co/Pt/Mn/ Ti—$Al_2O_3$ (HDM) | Example 9, C2155[2] Co/Pt/Mn/ Ti—$Al_2O_3$ | % difference in absolute $CH_4$ selectivity between Ex 31 and Ex 9[3] |
| 1 | 1.00 | 1.00 | −0.15 |
| 17 | 0.85 | 0.89 | −0.19 |
| 31 | 0.76 | 0.86 | −0.26 |

| | Relative FT rate[4] | | % difference in absolute FT rates between Ex 31 and Ex 9[5] |
|---|---|---|---|
| 1 | 1.00 | 1.00 | 0.21 |
| 17 | 0.66 | 0.70 | 0.15 |
| 31 | 0.66 | 0.70 | 0.15 |

[1] C % excluding $CO_2$ formation
[2] Drift in % $CH_4$ selectivity relative to day 1
[3] % $CH_4$ selectivity (sel) difference between C4585 and C2155 = (% $CH_4$ sel of C4585 − % $CH_4$ sel of C2155)/% $CH_4$ sel of C2155
[4] Relative to the initial FT rate ((CO + $CO_2$) μmol/CO/gs))
[5] % difference in FT rates between C4585 and C2155 = (FT rate of C4585 − FT rate of C2155)/FT rate of C2155

Example 32: MnTi—$SiO_2$ (Mn and Ti as Support Modifiers on a Silica Support)

Titanium (IV)iso-propoxide (17.2 g) was added to dry ethanol (78.9 g) and allowed to mix for 10 minutes. Amorphous, preshaped silica-gel (100 g), CARiACT Q-15, as obtained from Fuji Silysia, was added to this solution and allowed to mix for a further 10 minutes. The ethanol was removed under reduced pressure using the drying profile in Table 2 to obtain a free flowing powder.

Manganese(II)acetate tetrahydrate (13.8 g $Mn(Ac)_2.4H_2O$ for 3.1 g Mn loading) was dissolved in water (80-100 g) and allowed to mix for 10 minutes. The free flowing powder obtained from the $Ti(OPr)_4$ modified silica (100 g) was added to this solution and allowed to mix for a further 10 minutes. The water was removed under reduced pressure using drying profile in Table 3 to obtain a free flowing powder. After the drying step, the modified support was calcined in a fluidised bed with a GHSV of 2.5 $Nm^3$/kg support/hour using air as calcination gas at a heating rate of 1° C./min to 425° C. The support material was further calcined in a muffle oven to 500-550° C. at a heating rate of 5° C./min and a final hold time of 5 hours. The resulting modified support included 3.1 g Mn/2.6 g Ti/100 g $SiO_2$.

Example 33: (Inventive)—30 g Co/0.075 g Pt/100 g (3.1 g Mn/2.6 g Ti/100 $SiO_2$) (Mn and Ti as Support Modifiers), C4859

In a first impregnation step, $Co(NO_3)_2.6H_2O$ (39.5 g) and $(NH_4)_3Pt(NO_3)_2$ (0.025 g) were dissolved in water (50 g). The pH of the solution was adjusted to 2.3 using diluted nitric acid. The MnTi—$SiO_2$ (50 g) support as described in Example 32 was added to the mixture and the excess water removed under reduced pressure using the drying profile in Table 1 to obtain a free flowing powder. The free flowing powder was calcined in a fluidized bed calciner with a heating ramp rate of 1° C./min to 250° C. with a hold time of 6 hours using a GHSV of 2500 $Nm^3$/kg($Co(NO_3)_2.6H_2O$)/hour.

In a second impregnation step, $Co(NO_3)_2.6H_2O$ (28.4 g) and $(NH_4)_3Pt(NO_3)_2$ (0.04 g) were dissolved in water (50 g). The pH of the solution was adjusted to 2.3 using diluted nitric acid. The calcined material of the first impregnation step (50 g) was then added to this mixture and the excess water was removed under reduced pressure using the drying profile in Table 1 to obtain a free flowing powder. The free flowing powder was calcined in a fluidized bed calciner with a heating ramp rate of 1° C./min to 250° C. with a hold time of 6 hours using a GHSV of 2500 $Nm^3$/kg($Co(NO_3)_2.6H_2O$)/hour.

The calcined catalyst material was reduced and suspended into molten wax as described in Example 15. The catalyst was tested for its slurry phase FTS performance in a laboratory micro slurry CSTR as described in Example 17.

Discussion

As mentioned before, FIG. 1 shows the percentage difference in FT rate for Examples 1, 2, 6-8, 10, 11 and 33 relative to Example 9. The Mn/Ti combination on a silica support (Example 33) also demonstrated a significant enhancement in activity and activity stability compared to the comparative examples.

As mentioned before, FIG. 2 shows the relative (percentage difference in) methane selectivity for Examples 1, 2, 6-8, 10, 11 and 33 relative to Example 9. Example 33 containing the Mn/Ti combination on a silica support showed the lowest methane selectivity over time compared to the rest of the tested catalysts samples.

The invention claimed is:

1. A cobalt-containing catalyst composition comprising cobalt and/or a cobalt compound supported on and/or in a catalyst support selected from the group consisting of alumina in the form of one or more aluminum oxides; silica ($SiO_2$); magnesia (MgO); zinc oxide (ZnO); and mixtures thereof; the catalyst composition also including a titanium compound on and/or in the catalyst support in an amount of more than 1 wt % and not more than 10 wt % Ti, based on the weight of the catalyst support, excluding the weight of the Ti, the Ti being present in the form of one or more titanium compounds, and a manganese compound on and/or in the catalyst support in an amount of more than 0.5 wt % and less than 10 wt % Mn, based on the weight of the catalyst support, excluding the weight of the Mn, the Mn being present in the form of one or more manganese compounds.

2. The catalyst composition of claim 1 wherein the catalyst composition further comprises a dopant capable of enhancing the reducibility of the cobalt compound, the dopant being a metal selected from the group consisting of palladium (Pd), platinum, (Pt), ruthenium (Ru), rhenium (Re) and a mixture of two or more thereof.

3. The catalyst composition of claim 1 wherein the catalyst support is an alumina catalyst support or a silica ($SiO_2$) catalyst support.

4. A hydrocarbon synthesis process which includes contacting hydrogen with carbon monoxide at a temperature above 100° C. and at a pressure of at least 10 bar with the catalyst composition of claim 1 which comprises cobalt with a zero valency supplied on and/or in the catalyst support, to produce hydrocarbons and optionally, oxygenates of hydrocarbons.

5. The process of claim 4 wherein the process includes a hydroprocessing step for converting the hydrocarbons and optionally oxygenates thereof to liquid fuels and/or other chemicals.

6. A process for preparing a cobalt-containing catalyst precursor, the process comprising introducing a cobalt compound onto and/or into a catalyst support selected from the group consisting of alumina in the form of one or more aluminum oxides; silica ($SiO_2$); magnesia (MgO); zinc oxide (ZnO); and mixtures thereof; prior to and/or during and/or subsequent to introducing the cobalt compound onto and/or into the catalyst support, introducing a titanium compound onto and/or into the catalyst support in an amount of more than 1 wt % and not more than 10 wt % Ti, based on the weight of the catalyst support, excluding the weight of the Ti, the Ti being present in the form of one or more titanium compounds; and prior to, and/or during, and/or subsequent to introducing the cobalt compound onto and/or into the catalyst support, introducing a manganese compound onto and/or into the catalyst support in an amount of more than 0.5 wt % and less than 10 wt % Mn, based on the weight of the catalyst support, excluding the weight of the Mn, the Mn being present in the form of one or more manganese compounds, thereby providing a cobalt-containing catalyst precursor.

7. The process of claim 6 wherein a dopant capable enhancing the reducibility of the cobalt compound is also introduced onto and/or into the catalyst support.

8. The process of claim 6 wherein the catalyst support is an alumina catalyst support or a silica ($SiO_2$) catalyst support.

9. The process of claim 6 wherein the process includes one or more calcination steps wherein the titanium and manganese compounds introduced onto and/or into the catalyst support are converted to titanium oxide and manganese oxide respectively.

10. The process of claim 6 wherein the cobalt compound introduced onto and/or into the catalyst support is calcined thereby converting the cobalt compound into one more cobalt oxides.

11. The process of claim 6 wherein the catalyst precursor includes more than 1 wt % and not more than 10 wt % Ti, based on the weight of the catalyst support (excluding the weight of the Ti), the Ti being present in the form of one or more titanium compounds.

12. The process of claim 6 wherein the catalyst precursor includes more than 0.5 wt % and less than 10 wt % Mn, based on the weight of the catalyst support (excluding the weight of the Mn), the Mn being present in the form of one or more manganese compounds.

13. A process for preparing a cobalt-containing catalyst, the process includes preparing a cobalt-containing catalyst precursor according to the process of claim 6; and reducing the catalyst precursor, thereby activating the catalyst precursor.

* * * * *